US012624265B2

(12) United States Patent
Enjo et al.

(10) Patent No.: US 12,624,265 B2
(45) Date of Patent: May 12, 2026

(54) ANTISTATIC AGENT, ANTISTATIC COMPOSITION COMPRISING SAME, ANTISTATIC RESIN COMPOSITION COMPRISING SAME, AND MOLDED ARTICLE THEREOF

(71) Applicant: ADEKA CORPORATION, Tokyo (JP)

(72) Inventors: Naoki Enjo, Tokyo (JP); Kazukiyo Nomura, Tokyo (JP)

(73) Assignee: ADEKA CORPORATION, Tokyo (JP)

( * ) Notice: Subject to any disclaimer, the term of this patent is extended or adjusted under 35 U.S.C. 154(b) by 815 days.

(21) Appl. No.: 17/599,033

(22) PCT Filed: Dec. 5, 2019

(86) PCT No.: PCT/JP2019/047658
§ 371 (c)(1),
(2) Date: Sep. 28, 2021

(87) PCT Pub. No.: WO2020/202642
PCT Pub. Date: Oct. 8, 2020

(65) Prior Publication Data

US 2022/0177757 A1 Jun. 9, 2022

(30) Foreign Application Priority Data

Mar. 29, 2019 (JP) ................................ 2019-068420

(51) Int. Cl.
*C09K 3/16* (2006.01)
*C08G 59/42* (2006.01)

(52) U.S. Cl.
CPC ............ *C09K 3/16* (2013.01); *C08G 59/4276* (2013.01)

(58) Field of Classification Search
CPC .............................. C09K 3/16; C08G 59/4276
See application file for complete search history.

(56) References Cited

U.S. PATENT DOCUMENTS

| | | | | |
|---|---|---|---|---|
| 3,890,256 A * | 6/1975 | McFarlane | C08G 63/60 528/307 |
| 10,301,519 B2 * | 5/2019 | Nakamura | C08G 63/20 |
| 2005/0175919 A1 * | 8/2005 | Hayashi | G03G 9/0821 430/108.4 |
| 2005/0208397 A1 * | 9/2005 | Nakamura | G03G 9/09 430/45.51 |
| 2009/0317737 A1 * | 12/2009 | Okada | G03G 9/0823 430/111.41 |
| 2011/0200927 A1 * | 8/2011 | Jung | G03G 9/08764 430/105 |
| 2015/0079504 A1 * | 3/2015 | Farrugia | B32B 5/16 430/108.1 |
| 2015/0353796 A1 | 12/2015 | Nakamura et al. | |
| 2016/0289375 A1 | 10/2016 | Nakamura et al. | |
| 2017/0210959 A1 * | 7/2017 | Nakamura | C08L 67/02 |

FOREIGN PATENT DOCUMENTS

| | | | |
|---|---|---|---|
| GB | 2 112 789 | A | 7/1983 |
| JP | 49-35321 | | 4/1974 |
| JP | 58-118838 | A | 7/1983 |
| JP | 3-290464 | A | 12/1991 |
| JP | 2001-278985 | A | 10/2001 |
| JP | 2006-45386 | A | 2/2006 |
| JP | 2006-299494 | A | 11/2006 |
| JP | 2007-161972 | A | 6/2007 |
| JP | 2016-23254 | A | 2/2016 |
| WO | WO 2014/115745 | A1 | 7/2014 |
| WO | WO 2014/148454 | A1 | 9/2014 |
| WO | WO 2016/013323 | A1 | 1/2016 |
| WO | WO 2018/074477-1 | | 4/2018 |
| WO | WO 2019/021944 | A1 | 1/2019 |

OTHER PUBLICATIONS

International Search Report, issued in PCT/JP2019/047658, dated Mar. 10, 2020.
Written Opinion of the International Searching Authority, issued in PCT/JP2019/047658, dated Mar. 10, 2020.

* cited by examiner

*Primary Examiner* — Khanh T Nguyen
(74) *Attorney, Agent, or Firm* — Birch, Stewart, Kolasch & Birch, LLP

(57) ABSTRACT

Provided are: an antistatic agent which can continuously impart an excellent antistatic effect to a synthetic resin and has excellent storage stability and productivity (cutting property); an antistatic agent composition containing the same; an antistatic resin composition containing the antistatic agent or the antistatic agent composition; and a molded article thereof. The antistatic agent contains at least one polymer compound (E) which is obtained by a reaction of a polyester (a) obtained by a reaction between a diol (a1) and a dicarboxylic acid (a2), a compound (b) containing at least one ethyleneoxy group and having hydroxy groups at both ends, and an epoxy compound (D) containing two or more epoxy groups. The diol (a1) is at least either of 1,4-butanediol and ethylene glycol, and the dicarboxylic acid (a2) is succinic acid or a dicarboxylic acid mixture containing succinic acid.

20 Claims, No Drawings

ANTISTATIC AGENT, ANTISTATIC COMPOSITION COMPRISING SAME, ANTISTATIC RESIN COMPOSITION COMPRISING SAME, AND MOLDED ARTICLE THEREOF

TECHNICAL FIELD

The present invention relates to: an antistatic agent; an antistatic agent composition containing the same; an antistatic resin composition containing the antistatic agent or the antistatic agent composition (the antistatic resin composition is hereinafter also simply referred to as "resin composition"); and a molded article thereof. More particularly, the present invention relates to: an antistatic agent which can continuously impart an excellent antistatic effect to a synthetic resin and has excellent storage stability and productivity; an antistatic agent composition containing the same; an antistatic resin composition containing the antistatic agent or the antistatic agent composition; and a molded article thereof.

BACKGROUND ART

Synthetic resins such as thermoplastic resins are important materials that are indispensable today since they not only are lightweight and easy to process but also have excellent properties in that, for example, their base materials can be designed in accordance with the intended use. In addition, thermoplastic resins have excellent electrical insulation properties and are thus often utilized in the components of electric appliances and the like. However, there is a problem that thermoplastic resins are easily electrically charged by friction and the like because of their excessively high insulation performance.

An electrically charged thermoplastic resin attracts dust and dirt in the surroundings and thus causes a problem of deteriorating the external appearance of its molded article. In addition, among electronic products, for example, in precision instruments such as computers, an electric charge may interfere with normal operation of a circuit. Moreover, there are also problems caused by an electric shock. An electric shock to a person from a resin not only causes discomfort but also potentially induces accidental explosion in the presence of a flammable gas or dust.

In order to solve these problems, synthetic resins are conventionally subjected to an antistatic treatment. The most common antistatic treatment method is an addition of an antistatic agent to a synthetic resin of interest. Examples of the antistatic agent include coating-type antistatic agents that are coated on the surface of a resin molded article and kneading-type antistatic agents that are added when a resin is molded; however, the coating-type antistatic agents have poor persistence, and coating of a large amount of such an organic substance on a surface leads to a problem that objects coming into contact with the surface are contaminated.

From these viewpoints, conventionally, polymer-type antistatic agents which are kneaded into synthetic resins for use have been mainly examined and, for example, Patent Documents 1 and 2 propose the use of a polyether ester amide for the purpose of imparting antistaticity to a polyolefin-based resin. Further, Patent Document 3 proposes a block polymer having a structure in which a polyolefin block and a hydrophilic polymer block are repeatedly and alternately bound with each other. Moreover, Patent Document 4 proposes a polymer-type antistatic agent containing a polyester block.

RELATED ART DOCUMENTS

Patent Documents

[Patent Document 1] JPS58-118838A
[Patent Document 2] JPH03-290464A
[Patent Document 3] JP2001-278985A
[Patent Document 4] JP2016-023254A

SUMMARY OF THE INVENTION

Problems to be Solved by the Invention

However, these conventional antistatic agents are not necessarily said to have sufficient antistatic performance and, therefore, a further improvement is desired at present. In addition, conventional polymer-type antistatic agents have a problem in terms of storage stability in that, for example, they become sticky and cause blocking during long-term storage or storage under a high-temperature condition.

Particularly, polymer-type antistatic agents are often used by cutting the polymers thereof obtained by polymerization into the form of pellets, and such polymer-type antistatic agents have a problem in terms of storage stability in that, for example, their pellets become sticky and cause blocking during long-term storage or storage under a high-temperature condition. Moreover, when the polymer-type antistatic agents are cut into the form of pellets, there is a problem that a defective cutting occurs and the productivity is thereby largely deteriorated since, for example, the resulting pellets have uneven and irregular shapes, some of the pellets remain in a state of being connected without being completely cut, the pellets have rough surfaces, and/or the pellets are observed with burrs and cracks.

In view of the above, an object of the present invention is to provide: an antistatic agent which can continuously impart an excellent antistatic effect to a synthetic resin and has excellent storage stability and productivity (cutting property); an antistatic agent composition containing the same; an antistatic resin composition containing the antistatic agent or the antistatic agent composition; and a molded article thereof.

Means for Solving the Problems

The present inventors intensively studied to solve the above-described problems and consequently discovered that a polymer compound having a prescribed structure has excellent storage stability and productivity (cutting property) and can impart excellent antistatic performance to a synthetic resin, and that the above-described problems can be solved by using this polymer compound, thereby completing the present invention.

That is, the antistatic agent of the present invention is an antistatic agent containing at least one polymer compound (E) which is obtained by a reaction of a polyester (a) obtained by a reaction between a diol (a1) and a dicarboxylic acid (a2), a compound (b) containing at least one ethyleneoxy group and having hydroxy groups at both ends, and an epoxy compound (D) containing two or more epoxy groups, the antistatic agent being characterized in that:

the diol (a1) is at least either of 1,4-butanediol and ethylene glycol, and the dicarboxylic acid (a2) is succinic acid or a dicarboxylic acid mixture containing succinic acid.

In the antistatic agent of the present invention, it is preferred that the polymer compound (E) contain: a polyester block (A) constituted by the polyester (a); and a polyether block (B) constituted by the compound (b), and have a structure in which the polyester block (A) and the polyether block (B) are bound via ester bonds or ether bonds which are each formed by a reaction of a terminal hydroxy group or carboxyl group of the polyester (a), a terminal hydroxy group of the compound (b), and an epoxy group of the epoxy compound (D) or a hydroxy group formed by a reaction of the epoxy group. In the antistatic agent of the present invention, it is also preferred that the polymer compound (E) have a structure in which a block polymer (C) having carboxyl groups at both ends, in which the polyester block (A) and the polyether block (B) are repeatedly and alternately bound via ester bonds, and the epoxy compound (D) are bound via ester bonds. Further, in the antistatic agent of the present invention, it is preferred that the polyester (a) of the polymer compound (E) have a structure containing carboxyl groups at both ends. Still further, in the antistatic agent of the present invention, it is preferred that the compound (b) of the polymer compound (E) be a polyethylene glycol. Yet still further, in the antistatic agent of the present invention, it is preferred that the polymer compound (E) have a crystallization temperature in a range of 20 to 70° C. Yet still further, in the antistatic agent of the present invention, it is preferred that the polyester (a) of the polymer compound (E) have a number-average molecular weight of 1,000 to 10,000 in terms of polystyrene. Yet still further, in the antistatic agent of the present invention, it is preferred that the block polymer (C) of the polymer compound (E) have a number-average molecular weight of 5,000 to 50,000 in terms of polystyrene.

The antistatic agent composition of the present invention is characterized in that it is obtained by incorporating at least one selected from the group consisting of alkali metal salts and ionic liquids into the antistatic agent of the present invention.

The antistatic resin composition of the present invention is characterized in that it is obtained by incorporating the antistatic agent of the present invention into a synthetic resin. Another antistatic resin composition of the present invention is characterized in that it is obtained by incorporating the antistatic agent composition of the present invention into a synthetic resin.

In the antistatic resin composition of the present invention, the synthetic resin is preferably at least one selected from the group consisting of polyolefin-based resins, polystyrene-based resins, and copolymers thereof.

The molded article of the present invention is characterized by containing the antistatic resin composition of the present invention.

Effects of the Invention

According to the present invention, the followings can be provided: an antistatic agent which can continuously impart an excellent antistatic effect to a synthetic resin and has excellent storage stability and productivity (cutting property); an antistatic agent composition containing the same; an antistatic resin composition containing the antistatic agent or the antistatic agent composition; and a molded article thereof.

MODE FOR CARRYING OUT THE INVENTION

Embodiments of the present invention will now be described in detail.

The antistatic agent of the present invention contains at least one polymer compound (E) which is obtained by a reaction of a polyester (a) obtained by a reaction between a diol (a1) and a dicarboxylic acid (a2), a compound (b) containing at least one ethyleneoxy group and having hydroxy groups at both ends, and an epoxy compound (D) containing two or more epoxy groups. The term "ethyleneoxy group" used herein refers to a group represented by the following Formula (1):

$$—CH_2—CH_2—O— \quad (1)$$

In the antistatic agent of the present invention, the diol (a1) is at least either of 1,4-butanediol and ethylene glycol. These are superior to other diols in terms of antistaticity and its persistence, storage stability, and productivity (cutting property).

In the antistatic agent of the present invention, the dicarboxylic acid (a2) is succinic acid or a dicarboxylic acid mixture containing succinic acid. Succinic acid is superior to other dicarboxylic acids in terms of antistaticity and its persistence, storage stability, and productivity (cutting property).

Examples of a dicarboxylic acid that can be used as a mixture with succinic acid include aliphatic dicarboxylic acids and aromatic dicarboxylic acids, and these may be used individually, or two or more thereof may be used in combination.

Preferred examples of the aliphatic dicarboxylic acids include aliphatic dicarboxylic acids having 2 to 20 carbon atoms, such as oxalic acid, malonic acid, glutaric acid, methylsuccinic acid, dimethylmalonic acid, 3-methylglutaric acid, ethylsuccinic acid, isopropylmalonic acid, adipic acid, pimelic acid, suberic acid, azelaic acid, sebacic acid, undecanedioic acid, dodecanedioic acid (1,10-decanedicarboxylic acid), tridecanedioic acid, tetradecanedioic acid, hexadecanedioic acid, octadecanedioic acid, eicosanedioic acid, 1,3-cyclopentanedicarboxylic acid, 1,2-cyclopentanedicarboxylic acid, 1,4-cyclohexanedicarboxylic acid, 1,2-cyclohexanedicarboxylic acid, 1,3-cyclohexanedicarboxylic acid, 1,4-cyclohexanediacetic acid, 1,3-cyclohexanediacetic acid, 1,2-cyclohexanediacetic acid, 1,1-cyclohexanediacetic acid, dimer acid, maleic acid, and fumaric acid.

Preferred examples of the aromatic dicarboxylic acids include aromatic dicarboxylic acids having 8 to 20 carbon atoms, such as terephthalic acid, isophthalic acid, phthalic acid, phenylmalonic acid, homophthalic acid, phenylsuccinic acid, β-phenylglutaric acid, α-phenyladipic acid, β-phenyladipic acid, biphenyl-2,2'-dicarboxylic acid, biphenyl-4,4'-dicarboxylic acid, naphthalenedicarboxylic acid, sodium 3-sulfoisophthalate, and potassium 3-sulfoisophthalate.

From the standpoints of antistaticity and its persistence as well as storage stability and productivity (cutting property), the dicarboxylic acid used as a mixture with succinic acid is preferably an aliphatic dicarboxylic acid, more preferably adipic acid or sebacic acid, most preferably adipic acid.

In the dicarboxylic acid (a2), from the standpoints of antistaticity and its persistence as well as storage stability and productivity (cutting property), the ratio of succinic acid and other dicarboxylic acid (e.g., adipic acid) is preferably 100:0 to 50:50, more preferably 100:0 to 70:30, still more preferably 100:0 to 80:20, yet still more preferably 100:0 to 90:10, in terms of molar ratio.

From the standpoints of antistaticity and its persistence as well as storage stability and productivity (cutting property), it is preferred that the polymer compound (E) according to the antistatic agent of the present invention contain: a polyester block (A) constituted by the polyester (a); and a polyether block (B) constituted by the compound (b), and have a structure in which the polyester block (A) and the polyether block (B) are bound via ester bonds or ether bonds which are each formed by a reaction of a terminal hydroxy group or carboxyl group of the polyester (a), a terminal hydroxy group of the compound (b), and an epoxy group of the epoxy compound (D) containing two or more epoxy groups, or a hydroxy group formed by a reaction of the epoxy group. It is noted here that the "hydroxy group formed by a reaction of the epoxy group" is a hydroxy group that is formed by a ring-opening reaction of an epoxy group of the epoxy compound (D) with a hydroxy group or a carboxyl group.

In the polymer compound (E) according to the antistatic agent of the present invention, from the standpoints of antistaticity and its persistence as well as storage stability and productivity (cutting property), it is particularly preferred that a block polymer (C) having carboxyl groups at both ends, in which the polyester block (A) and the polyether block (B) are repeatedly and alternately bound via ester bonds, and the epoxy compound (D) containing two or more epoxy groups be bound via ester bonds. Examples of the ester bonds include an ester bond formed by a reaction between a carboxyl group of the block polymer (C) and an epoxy group of the epoxy compound (D), and an ester bond formed by a reaction between a hydroxy group formed by ring-opening of the epoxy group in this ester bond-forming reaction, and a carboxyl group. In the antistatic agent of the present invention, the block polymer (C) and the epoxy compound (D) may be bound via either of these ester bonds and, from the standpoints of antistaticity and its persistence as well as storage stability and productivity (cutting property), it is more preferred that the block polymer (C) and the epoxy compound (D) be bound via both of these ester bonds.

In the polymer compound (E) according to the antistatic agent of the present invention, the polyester (a) may be any polyester that is obtained by allowing a diol component (a1), which is at least either of 1,4-butanediol and ethylene glycol, and a dicarboxylic acid component (a2), which is succinic acid or a dicarboxylic acid mixture containing succinic acid, to undergo an esterification reaction (including a transesterification reaction). The esterification reaction in the antistatic agent of the present invention is not particularly restricted as long as it is an ester bond-forming reaction. The diol component (a1) may be 1,4-butanediol alone, ethylene glycol alone, or a combination of 1,4-butanediol and ethylene glycol. From the standpoints of antistaticity and its persistence as well as storage stability and productivity (cutting property), the diol component (a1) is preferably 1,4-butanediol and, when 1,4-butanediol and ethylene glycol are used in combination, a higher ratio of 1,4-butanediol is more preferred from the standpoints of antistaticity and its persistence as well as storage stability and productivity (cutting property), In the diol component (a1), from the standpoints of antistaticity and its persistence as well as storage stability and productivity (cutting property), the ratio of 1,4-butanediol and ethylene glycol is preferably 100:0 to 50:50, more preferably 100:0 to 70:30, still more preferably 100:0 to 80:20, in terms of molar ratio.

Succinic acid used as the dicarboxylic acid component (a2) in the polymer compound (E) according to the antistatic agent of the present invention may be a derivative of succinic acid, and examples thereof include succinic anhydride, succinic acid esters (e.g., succinic acid alkyl esters such as succinic acid methyl ester), alkali metal succinates (e.g., sodium succinate), and succinic acid halides (e.g., succinic acid chloride). Further, the dicarboxylic acid used as a mixture with succinic acid may be a derivative of a dicarboxylic acid. Examples thereof include carboxylic anhydride, carboxylic acid esters (e.g., carboxylic acid alkyl esters such as carboxylic acid methyl ester), alkali metal carboxylates (e.g., sodium carboxylate), and carboxylic acid halides (e.g., carboxylic acid chloride). Two or more dicarboxylic acids may be used as a mixture with succinic acid.

Next, the compound (b) and a preferred polyether block (B) of the polymer compound (E) will be described. The polyether block (B) is constituted by the compound (b) which has hydroxy groups at both ends and contains at least one ethyleneoxy group represented by the following Formula (1):

$$-CH_2-CH_2-O- \quad (1)$$

The compound (b), which contains at least one ethyleneoxy group represented by Formula (1) and has hydroxy groups at both ends, is preferably a hydrophilic compound, more preferably a polyether containing the ethyleneoxy group represented by Formula (1). From the standpoints of antistaticity and its persistence as well as storage stability and productivity (cutting property), the compound (b) is still more preferably a polyethylene glycol, particularly preferably a polyethylene glycol represented by the following Formula (2):

$$HO-\!\!\left[CH_2-CH_2-O\right]_m\!\!-H \quad (2)$$

In Formula (2), m represents a number of 5 to 250. From the standpoints of antistaticity and its persistence as well as storage stability, m is preferably 20 to 200, more preferably 40 to 180.

Examples of the compound (b) include: polyethylene glycols obtained by an addition reaction of ethylene oxide; and polyethers obtained by an addition reaction of ethylene oxide and at least one other alkylene oxide, such as propylene oxide or 1,2-, 1,4-, 2,3- or 1,3-butylene oxide, which polyethers may be random or block polyethers.

Examples of the compound (b) also include: compounds having a structure in which ethylene oxide is added to an active hydrogen atom-containing compound; and compounds having a structure in which ethylene oxide and at least one other alkylene oxide, such as propylene oxide or 1,2-, 1,4-, 2,3- or 1,3-butylene oxide, are added. The addition in these compounds may be random or block addition.

The active hydrogen atom-containing compound is, for example, a glycol, a dihydric phenol, a primary monoamine, a secondary diamine, or a dicarboxylic acid.

As the glycol, for example, an aliphatic glycol having 2 to 20 carbon atoms, an alicyclic glycol having 5 to 12 carbon atoms, or an aromatic glycol having 8 to 26 carbon atoms can be used.

Examples of the aliphatic glycol include ethylene glycol, 1,2-propylene glycol, 1,3-propanediol, 1,2-butanediol, 1,3-butanediol, 1,4-butanediol, 1,3-hexanediol, 1,4-hexanediol, 1,6-hexanediol, 2,5-hexanediol, 1,2-octanediol, 1,8-octanediol, 1,10-decanediol, 1,18-octadecanediol, 1,20-eicosanediol, diethylene glycol, triethylene glycol, and thiodiethylene glycol.

Examples of the alicyclic glycol include 1-hydroxymethyl-1-cyclobutanol, 1,2-cyclohexanediol, 1,3-cyclohexanediol, 1,4-cyclohexanediol, 1-methyl-3,4-cyclohexanediol, 2-hydroxymethylcyclohexanol, 4-hydroxymethylcyclohexanol, 1,4-cyclohexane dimethanol, and 1,1'-dihydroxy-1,1'-dicyclohexanol.

Examples of the aromatic glycol include dihydroxymethylbenzene, 1,4-bis(β-hydroxyethoxy)benzene, 2-phenyl-1,3-propanediol, 2-phenyl-1,4-butanediol, 2-benzyl-1,3-propanediol, triphenylethylene glycol, tetraphenylethylene glycol, and benzopinacol.

As the dihydric phenol, a phenol having 6 to 30 carbon atoms can be used, and examples thereof include catechol, resorcinol, hydroquinone, bisphenol A, bisphenol F, bisphenol S, dihydroxydiphenyl ether, dihydroxydiphenyl thioether, binaphthol, and alkyl (C1 to C10) or halogen substitution products of these phenols.

Examples of the primary monoamine include aliphatic primary monoamines having 1 to 20 carbon atoms, such as methylamine, ethylamine, n-propylamine, isopropylamine, n-butylamine, s-butylamine, isobutylamine, n-amylamine, isoamylamine, n-hexylamine, n-heptylamine, n-octylamine, n-decylamine, n-octadecylamine, and n-eicosylamine.

As the secondary diamine, for example, an aliphatic secondary diamine having 4 to 18 carbon atoms, a heterocyclic secondary diamine having 4 to 13 carbon atoms, an alicyclic secondary diamine having 6 to 14 carbon atoms, an aromatic secondary diamine having 8 to 14 carbon atoms, or a secondary alkanoldiamine having 3 to 22 carbon atoms can be used.

Examples of the aliphatic secondary diamine include N,N'-dimethylethylenediamine, N,N'-diethylethylenediamine, N,N'-dibutylethylenediamine, N,N'-dimethylpropylenediamine, N,N'-diethylpropylenediamine, N,N'-dibutylpropylenediamine, N,N'-dimethyltetramethylenediamine, N,N'-diethyltetramethylenediamine, N,N'-dibutyltetramethylenediamine, N,N'-dimethylhexamethylenediamine, N,N'-diethylhexamethylenediamine, N,N'-dibutylhexamethylenediamine, N,N'-dimethyldecamethylenediamine, N,N'-diethyldecamethylenediamine, and N,N'-dibutyldecamethylenediamine.

Examples of the heterocyclic secondary diamine include piperazine and 1-aminopiperidine.

Examples of the alicyclic secondary diamine include N,N'-dimethyl-1,2-cyclobutanediamine, N,N'-diethyl-1,2-cyclobutanediamine, N,N'-dibutyl-1,2-cyclobutanediamine, N,N'-dimethyl-1,4-cyclohexanediamine, N,N'-diethyl-1,4-cyclohexanediamine, N,N'-dibutyl-1,4-cyclohexanediamine, N,N'-dimethyl-1,3-cyclohexanediamine, N,N'-diethyl-1,3-cyclohexanediamine, and N,N'-dibutyl-1,3-cyclohexanediamine.

Examples of the aromatic secondary diamine include N,N'-dimethyl-phenylenediamine, N,N'-dimethyl-xylylenediamine, N,N'-dimethyl-diphenylmethanediamine, N,N'-dimethyl-diphenyl ether diamine, N,N'-dimethyl-benzidine, and N,N'-dimethyl-1,4-naphthalenediamine.

Examples of the secondary alkanoldiamine include N-methyldiethanolamine, N-octyldiethanolamine, N-stearyldiethanolamine, and N-methyldipropanolamine.

As the dicarboxylic acid, a dicarboxylic acids having 2 to 20 carbon atoms can be used, and examples thereof include aliphatic dicarboxylic acids, aromatic dicarboxylic acids, and alicyclic dicarboxylic acids.

Examples of the aliphatic dicarboxylic acids include oxalic acid, malonic acid, succinic acid, glutaric acid, methylsuccinic acid, dimethylmalonic acid, β-methylglutaric acid, ethylsuccinic acid, isopropylmalonic acid, adipic acid, pimelic acid, suberic acid, azelaic acid, sebacic acid, undecanedicarboxylic acid, dodecanedicarboxylic acid, tridecanedicarboxylic acid, tetradecanedicarboxylic acid, hexadecanedicarboxylic acid, octadecanedicarboxylic acid, and eicosanedicarboxylic acid.

Examples of the aromatic dicarboxylic acids include terephthalic acid, isophthalic acid, phthalic acid, phenylmalonic acid, homophthalic acid, phenylsuccinic acid, β-phenylglutaric acid, α-phenyladipic acid, β-phenyladipic acid, biphenyl-2,2'-dicarboxylic acid, biphenyl-4,4'-dicarboxylic acid, naphthalenedicarboxylic acid, sodium 3-sulfoisophthalate, and potassium 3-sulfoisophthalate.

Examples of the alicyclic dicarboxylic acids include 1,3-cyclopentanedicarboxylic acid, 1,2-cyclopentanedicarboxylic acid, 1,4-cyclohexanedicarboxylic acid, 1,2-cyclohexanedicarboxylic acid, 1,3-cyclohexanedicarboxylic acid, 1,4-cyclohexanediacetic acid, 1,3-cyclohexanediacetic acid, 1,2-cyclohexanediacetic acid, and dicyclohexyl-4,4'-dicarboxylic acid.

These active hydrogen atom-containing compounds may be used individually, or two or more thereof may be used in combination.

Next, the epoxy compound (D) containing two or more epoxy groups, which constitutes the polymer compound (E), will be described. The epoxy compound (D) used in the present invention is not particularly restricted as long as it has two or more epoxy groups, and examples of such an epoxy compound include: polyglycidyl ether compounds of mononuclear polyhydric phenol compounds, such as hydroquinone, resorcin, pyrocatechol, and phloroglucinol; polyglycidyl ether compounds of polynuclear polyhydric phenol compounds, such as dihydroxynaphthalene, biphenol, methylene bisphenol (bisphenol F), methylene bis (o-cresol), ethylidene bisphenol, isopropylidene bisphenol (bisphenol A), isopropylidene bis (o-cresol), tetrabromobisphenol A, 1,3-bis (4-hydroxycumylbenzene), 1,4-bis (4-hydroxycumylbenzene), 1,1,3-tris (4-hydroxyphenyl) butane, 1,1,2,2-tetra (4-hydroxyphenyl) ethane, thiobisphenol, sulfobisphenol, oxybisphenol, phenol novolac, o-cresol novolac, ethylphenol novolac, butylphenol novolac, octylphenol novolac, resorcin novolac, and terpene phenol; polyglycidyl ethers of polyhydric alcohols, such as ethylene glycol, propylene glycol, butylene glycol, hexanediol, diethylene glycol, polyethylene glycol, dipropylene glycol, polypropylene glycol, polyglycol, thiodiglycol, glycerin, trimethylolpropane, pentaerythritol, sorbitol, bisphenol A-ethylene oxide adduct, and dicyclopentadiene dimethanol; glycidyl esters of an aliphatic, aromatic or alicyclic polybasic acid, such as maleic acid, fumaric acid, itaconic acid, succinic acid, glutaric acid, suberic acid, adipic acid, azelaic acid, sebacic acid, dimer acid, trimer acid, phthalic acid, isophthalic acid, terephthalic acid, trimellitic acid, trimesic acid, pyromellitic acid, tetrahydrophthalic acid, hexahydrophthalic acid or endomethylene tetrahydrophthalic acid, and homo- or co-polymers of glycidyl methacrylate; glycidylamino group-containing epoxy compounds, such as N,N-diglycidyl aniline, bis(4-(N-methyl-N-glycidylamino)phenyl)methane, and diglycidyl o-toluidine; epoxidized cyclic olefin compounds, such as vinylcyclohexene diepoxide, dicyclopentadiene diepoxide, 3,4-epoxycyclohexylmethyl-3,4-epoxycyclohexane carboxylate, 3,4-epoxy-6-methylcyclohexylmethyl-6-methylcyclohexane carboxylate, and bis(3,4-epoxy-6-methylcyclohexylmethyl)

adipate; epoxidized conjugated diene polymers, such as epoxidized polybutadienes and epoxidized styrene-butadiene copolymers; heterocyclic compounds, such as triglycidyl isocyanurate; and epoxidized soybean oil. These epoxy compounds may be internally cross-linked by a prepolymer of terminal isocyanate, or may be allowed to have a high molecular weight using a multivalent active hydrogen compound (e.g., a polyhydric phenol, a polyamine, a carbonyl group-containing compound, or a polyphosphate). Two or more of such epoxy compounds (D) may be used in combination.

From the standpoints of antistaticity and its persistence as well as storage stability and productivity (cutting property), the epoxy compound (D) is preferably bisphenol F diglycidyl ether, dicyclopentadiene dimethanol diglycidyl ether, or hydrogenated bisphenol A diglycidyl ether.

From the standpoints of antistaticity and its persistence as well as storage stability and productivity (cutting property), the epoxy compound (D) has an epoxy equivalent of preferably 70 to 2,000, more preferably 100 to 1,000, particularly preferably 150 to 600.

The polymer compound (E) according to the antistatic agent of the present invention is obtained by a reaction of the polyester (a) obtained by a reaction between the diol (a1) and the dicarboxylic acid (a2), the compound (b) containing at least one ethyleneoxy group and having hydroxy groups at both ends, and the epoxy compound (D) containing two or more epoxy groups. From the standpoints of antistaticity and its persistence as well as storage stability and productivity (cutting property), it is preferred that the polymer compound (E) contain: a polyester block (A) constituted by the polyester (a); and a polyether block (B) constituted by the compound (b), and have a structure in which the polyester block (A) and the polyether block (B) are bound via ester bonds or ether bonds which are each formed by a reaction of a terminal hydroxy group or carboxyl group of the polyester (a), a terminal hydroxy group of the compound (b), and an epoxy group of the epoxy compound (D) containing two or more epoxy groups, or a hydroxy group formed by a reaction of the epoxy group.

Further, from the standpoints of antistaticity and its persistence as well as storage stability and productivity (cutting property), it is preferred that the polymer compound (E) according to the antistatic agent of the present invention have a structure in which a block polymer (C) having carboxyl groups at both ends, in which the polyester block (A) constituted by the polyester (a) and the polyether block (B) constituted by the compound (b) are repeatedly and alternately bound via ester bonds, and the epoxy compound (D) are bound via ester bonds each formed by a carboxyl group of the block polymer (C) and an epoxy group of the epoxy compound (D), and it is also preferred that the polymer compound (E) have a structure in which the block polymer (C) and the epoxy compound (D) are bound via ester bonds each formed by a reaction between a hydroxy group, which is formed by ring-opening of an epoxy group through a reaction with a carboxyl group, and a carboxyl group.

The polyester (a) which constitutes the polyester block (A) according to the polymer compound (E) of the present invention may be any polyester composed of the diol (a1) and the dicarboxylic acid (a2) and, from the standpoints of antistaticity and its persistence as well as storage stability and productivity (cutting property), it is preferred that the polyester (a) have a structure in which a residue obtained by removing a hydroxy group from the diol (a1) and a residue obtained by removing a carboxyl group from the dicarboxylic acid (a2) are bound via an ester bond.

From the standpoints of antistaticity and its persistence as well as storage stability and productivity (cutting property), it is also preferred that the polyester (a) have a structure containing carboxyl groups at both ends. From the standpoints of antistaticity and its persistence as well as storage stability and productivity (cutting property), the polymerization degree of the polyester (a) is preferably in a range of 2 to 50.

The polyester (a) having carboxyl groups at both ends can be obtained by allowing the diol (a1) (at least either of 1,4-butanediol and ethylene glycol) and the dicarboxylic acid (a2) (e.g., succinic acid) to undergo an esterification reaction.

The dicarboxylic acid (a2) (e.g., succinic acid) may be a derivative thereof (e.g., an acid anhydride, an ester such as an alkyl ester, an alkali metal salt, or an acid halide) and, in cases where the polyester (a) is obtained using such a derivative, both ends of the polyester (a) can be eventually treated to be carboxyl groups, and the polyester (a) in this state may be directly subjected to the subsequent reaction for obtaining the block polymer (C) having a structure containing carboxyl groups at both ends.

As for the reaction ratio of the dicarboxylic acid (a2) and the diol (a1), it is preferred to use the dicarboxylic acid (a2) in an excess amount, particularly in an excess of 1 mole in terms of molar ratio with respect to the diol (a1), such that the resultant has carboxyl groups at both ends. In the esterification reaction, a catalyst which facilitates esterification reaction may be used and, as the catalyst, a conventionally known catalyst such as dibutyl tin oxide, tetraalkyl titanate, zirconium acetate, or zinc acetate can be used.

In cases where a derivative such as an ester, an alkali metal salt or an acid halide is used in place of the dicarboxylic acid, after the derivative and the diol are allowed to react with each other, both ends of the resultant may be treated to be dicarboxylic acids, or the resultant may be directly subjected to the subsequent reaction for obtaining the block polymer (C) having a structure containing carboxyl groups at both ends.

A preferred polyester (a), which is composed of the diol (a1) and the dicarboxylic acid (a2) and has carboxyl groups at both ends, is one which reacts with the compound (b) to form an ester bond and thereby constitutes the structure of the block polymer (C), and the carboxyl groups at the both ends may be protected or modified, or may be in a precursor form. Further, in order to inhibit oxidation of the product during the reaction, an antioxidant such as a phenolic antioxidant may be added to the reaction system.

The compound (b), which contains at least one ethyleneoxy group and has hydroxy groups at both ends, is preferably a compound which reacts with the polyester (a) to form an ester bond or an ether bond, preferably an ester bond, and thereby constitutes the structure of the block polymer (C), and the hydroxy groups at the both ends may be protected or modified, or may be in a precursor form.

The block polymer (C) of the polymer compound (E) according to the antistatic agent of the present invention, which has a structure containing carboxyl groups at both ends, contains a block (A) constituted by the polyester (a) and a block (B) constituted by the compound (b), and has a structure in which these blocks are repeatedly and alternately bound via ester bonds formed by carboxyl groups and hydroxy groups. One example of the block polymer (C) is a block polymer having a structure represented by the following Formula (3):

(3)

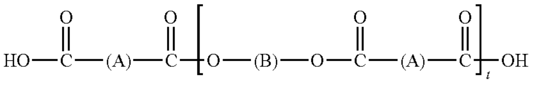

In the Formula (3), (A) represents a block constituted by the polyester (a) having carboxyl groups at both ends; (B) represents a block constituted by the compound (b) having hydroxy groups at both ends; and t represents the number of repeating units, which is preferably 1 to 10, more preferably 1 to 7, most preferably 1 to 5, from the standpoints of antistaticity and its persistence as well as storage stability and productivity (cutting property).

The block polymer (C) having a structure containing carboxyl groups at both ends can be obtained by allowing the polyester (a) having carboxyl groups at both ends and the compound (b) having hydroxy groups at both ends to undergo a polycondensation reaction; however, as long as the block polymer (C) has a structure that is equivalent to one in which the polyester (a) and the compound (b) are repeatedly and alternately bound via ester bonds formed by carboxyl groups and hydroxy groups, it is not necessarily required that the block polymer (C) be synthesized from the polyester (a) and the compound (b).

As for the reaction ratio between the polyester (a) and the compound (b), by adjusting the amount of the polyester (a) to be (X+1) mol with respect to X mol of the compound (b), the block polymer (C) having carboxyl groups at both ends can be preferably obtained.

As for the reaction, after the completion of a synthesis reaction of the polyester (a) and without the thus synthesized polyester (a) being isolated, the compound (b) may be added to the reaction system and allowed to react as is.

In the poly condensation reaction, a catalyst which facilitates esterification reaction may be used and, as the catalyst, a conventionally known catalyst such as dibutyl tin oxide, tetraalkyl titanate, zirconium acetate, or zinc acetate can be used. Further, in order to inhibit oxidation of the product during the reaction, an antioxidant such as a phenolic antioxidant may be added to the reaction system.

From the standpoints of antistaticity and its persistence as well as storage stability and productivity (cutting property), the polymer compound (E) according to the antistatic agent of the present invention preferably has a structure in which the block polymer (C) having a structure containing carboxyl groups at both ends and the epoxy compound (D) containing two or more epoxy groups are bound via ester bonds. The ester bonds may each be either an ester bond formed by a reaction between a terminal carboxyl group of the block polymer (C) and an epoxy group of the epoxy compound (D) or an ester bond formed by a reaction between a hydroxy group formed by this reaction (reaction between carboxyl group and epoxy group) and a carboxyl group. From the standpoints of antistaticity and its persistence as well as storage stability and productivity (cutting property), it is preferred that both of these ester bonds exist.

The polymer compound (E) may further contain an ester bond formed by a carboxyl group of the polyester (a) and an epoxy group of the epoxy compound (D).

Further, the polymer compound (E) may also contain an ester bond formed by a carboxyl group of the polyester (a) and a hydroxy group formed by a reaction of an epoxy group of the epoxy compound.

Still further, the polymer compound (E) may also contain an ether bond formed by a hydroxy group of the polyester (a) or a hydroxy group of the compound (b) and an epoxy group of the epoxy compound (D).

In order to obtain a preferred polymer compound (E), the block polymer (C) and the epoxy compound (D) can be allowed to react with each other. In other words, the carboxyl groups of the block polymer (C) and the epoxy groups of the epoxy compound (D) can be allowed to react with each other. More preferably, hydroxy groups formed from the reacted epoxy groups may be allowed to react with carboxyl groups. The number of the epoxy groups in the epoxy compound (D) is preferably 0.5 to 5 equivalents, more preferably 0.5 to 1.5 equivalents, with respect to the number of the carboxyl groups in the block polymer (C) to be reacted. The reaction may be carried out in a variety of solvents, and it may be performed in a molten state.

The amount of the epoxy compound (D) containing two or more epoxy groups to be used in the reaction is preferably 0.1 to 2.0 equivalents, more preferably 0.2 to 1.5 equivalents, with respect to the number of the carboxyl groups of the block polymer (C) to be reacted.

As for the reaction, after the completion of a synthesis reaction of the block polymer (C) and without the thus synthesized block polymer (C) being isolated, the epoxy compound (D) may be added to the reaction system and allowed to react as is. In that case, unreacted carboxyl groups of the polyester (a) used in an excess amount in the synthesis of the block polymer (C) may react with some of the epoxy groups of the epoxy compound (D) to form ester bonds.

It is not necessarily required that a preferred polymer compound (E) according to the antistatic agent of the present invention be synthesized from the block polymer (C) and the epoxy compound (D) as long as the polymer compound (E) has a structure that is equivalent to one in which the block polymer (C) having a structure containing carboxyl groups at both ends and the epoxy compound (D) containing two or more epoxy groups are bound via ester bonds formed by carboxyl groups of the block polymer (C) and epoxy groups of the epoxy compound (D). These ester bonds formed by the carboxyl groups and the epoxy groups include an ester bond which is formed by a carboxyl group and a hydroxy group formed from an epoxy group through a reaction with a carboxyl group.

In the antistatic agent of the present invention, the number-average molecular weight of the compound (b) which has hydroxy groups at both ends and constitutes the block (B) in the polymer compound (E) is calculated from a measured hydroxyl value and, from the standpoints of antistaticity and its persistence as well as storage stability and productivity (cutting property), it is preferably 400 to 10,000, more preferably 1,000 to 8,000, still more preferably 2,000 to 8,000. A method of measuring the hydroxyl value and a method of calculating the number-average molecular weight from the hydroxyl value are described below.

<Method of Calculating Number-Average Molecular Weight from Hydroxyl Value>

The hydroxyl value is measured by the below-described hydroxyl value measurement method, and the number-average molecular weight (hereinafter, also referred to as "Mn") is determined by the following equation:

$$\text{Number-average molecular weight} = (56{,}110 \times 2)/\text{hydroxyl value}$$

<Hydroxyl Value Measurement Method>

Reagent A (Acetylating Agent)

(1) triethyl phosphate: 1,560 mL (2) acetic anhydride: 193 mL (3) perchloric acid (60%): 16 g The reagent A is obtained by mixing the above materials in the order of (1), (2), and (3).

Reagent B

Pyridine and pure water are mixed at a volume ratio of 3:1.

Reagent C

Two to three droplets of a phenolphthalein solution is added to 500 mL of isopropyl alcohol, and the resultant is neutralized with a TN KOH aqueous solution.

First, 2 g of a sample is weighed in a 200-mL Erlenmeyer flask, 10 mL of triethyl phosphate is added thereto, and the sample is dissolved with heating. Then, 15 mL of the reagent A is added, and the flask is sealed with a stopper and vigorously shaken.

Subsequently, 20 mL of the reagent B is added, and the flask is sealed with a stopper and vigorously shaken, followed by an addition of 50 mL of the reagent C. The resultant is titrated with a TN KOH aqueous solution to calculate the hydroxyl value using the following equation:

$$\text{Hydroxyl value [mg KOH/g]}=56.11\times f\times(T-B)/S$$

f: factor of TN KOH aqueous solution

B: titer in blank test [mL]

T: titer in main test [mL]

S: sample amount [g]

In the antistatic agent of the present invention, from the standpoints of antistaticity and its persistence as well as storage stability and productivity (cutting property), the number-average molecular weight of the polyester (a) constituting the block (A) in the polymer compound (E) is, in terms of polystyrene, preferably 1,000 to 10,000, more preferably 1,500 to 8,000, still more preferably 2,500 to 7,500. When the number-average molecular weight is less than 1,000, the storage stability may be deteriorated, while when the number-average molecular weight is higher than 10,000, the time required for the reaction for obtaining the polymer compound (E) is extended, which may deteriorate the economic efficiency and cause coloration of the resulting polymer compound due to the extended reaction time.

The number-average molecular weight in terms of polystyrene is preferably measured by gel permeation chromatography (GPC), and a measurement method thereof is described below.

<Method of Measuring Number-Average Molecular Weight in Terms of Polystyrene>

The number-average molecular weight (hereinafter, also referred to as "Mn") is measured by gel permeation chromatography (GPC). The Mn measurement conditions are as follows.

Apparatus: GPC apparatus, manufactured by JASCO Corporation

Solvent: chloroform

Standard substance: polystyrene

Detector: differential refractometer (RI detector)

Column stationary phase: SHODEX LF-804, manufactured by Showa Denko K.K.

Column temperature: 40° C.

Sample concentration: 1 mg/1 mL

Flow rate: 0.8 mL/min

Injection volume: 100 μL

Further, from the standpoints of antistaticity and its persistence as well as storage stability and productivity (cutting property), the number-average molecular weight of the block polymer (C) having a structure containing carboxyl groups at both ends in the polymer compound (E) is, in terms of polystyrene, preferably 5,000 to 50,000, more preferably 10,000 to, 45,000, still more preferably 15,000 to 40,000. When the number-average molecular weight is less than 5,000, the storage stability may be deteriorated, while when the number-average molecular weight is higher than 50,000, the time required for the reaction for obtaining the polymer compound (E) is extended, which may deteriorate the economic efficiency and cause coloration of the resulting polymer compound due to the extended reaction time. The number-average molecular weight in terms of polystyrene is preferably measured by gel permeation chromatography (GPC), and a measurement method thereof is as described above.

The polymer compound (E) according to the antistatic agent of the present invention may also be obtained by preparing the polyester (a) from the diol (a1) and the dicarboxylic acid (a2), and subsequently allowing the polyester (a) to react with the compound (b) and/or the epoxy compound (D) without isolating the polyester (a).

From the standpoints of antistaticity and its persistence, particularly storage stability and productivity (cutting property), the polymer compound (E) according to the antistatic agent of the present invention has a crystallization temperature in a range of preferably 20° C. to 70° C., more preferably 30° C. to 70° C., still more preferably 40° C. to 70° C., yet still more preferably 50° C. to 70° C., yet still more preferably 55° C. to 70° C., yet still more preferably 60° C. to 70° C. The storage stability and the productivity (cutting property) may be deteriorated when the crystallization temperature is lower than 20° C., and the productivity (cutting property) may be deteriorated also when the crystallization temperature is higher than 70° C. In the antistatic agent of the present invention, the crystallization temperature is measured by the following crystallization temperature measurement method.

<Crystallization Temperature Measurement Method>

The crystallization temperature is measured using a differential scanning calorimeter (DSC). A sample is weighed in an amount of 3±1 mg in an aluminum pan, heated from room temperature (25° C.) to 130° C. at a rate of 10° C./min, maintained for 5 minutes, and then cooled to 0° C. at a rate of 10° C./min to obtain a chart. In this chart, the temperature of an endothermic peak top is defined as the crystallization temperature.

The polymer compound (E) according to the antistatic agent of the present invention is preferably used in the form of pellets from the standpoint of the ease of handling. In order to prepare the polymer compound (E) in the form of pellets, the polymer may be extruded from an extruder after a polymerization reaction and subsequently cut into pellets. For the cutting, a machine such as a pelletizer can be used.

The antistatic agent composition of the present invention will now be described.

The antistatic agent composition of the present invention is obtained by incorporating at least one selected from the group consisting of alkali metal salts and ionic liquids into the antistatic agent of the present invention. By further incorporating at least one selected from the group consisting of alkali metal salts and ionic liquids into the antistatic agent of the present invention, an antistatic agent composition having excellent antistatic performance and its persistence is preferably obtained.

First, the alkali metal salts will be described. Examples of the alkali metal salts include salts of organic acids and inorganic acids, and examples of the alkali metal include lithium, sodium, potassium, cesium, and rubidium. Examples of the organic acids include: aliphatic monocarboxylic acids having 1 to 18 carbon atoms, such as formic acid, acetic acid, propionic acid, butyric acid, and lactic acid; aliphatic dicarboxylic acids having 1 to 12 carbon atoms, such as oxalic acid, malonic acid, succinic acid, fumaric acid, maleic acid, and adipic acid; aromatic carboxylic acids, such as benzoic acid, phthalic acid, isophthalic acid, terephthalic acid, and salicylic acid; and sulfonic acids having 1 to 20 carbon atoms, such as methanesulfonic acid, p-toluenesulfonic acid, dodecylbenzenesulfonic acid, and trifluoromethanesulfonic acid. Examples of the inorganic acids include hydrochloric acid, hydrobromic acid, sulfuric acid, sulfurous acid, phosphoric acid, phosphorous acid, polyphosphoric acid, nitric acid, and perchloric acid. Thereamong, from the standpoints of antistaticity and its persistence as well as safety for the living bodies and environment, salts of lithium, sodium and potassium are preferred, and sodium salts are more preferred. Further, from the standpoints of antistaticity and its persistence, acetates, perchlorates, p-toluenesulfonates and dodecylbenzenesulfonates are preferred, and dodecylbenzenesulfonates are more preferred. The alkali metal salts may be used in combination of two or more thereof.

Specific examples of the alkali metal salts include lithium acetate, sodium acetate, potassium acetate, lithium chloride, sodium chloride, potassium chloride, lithium phosphate, sodium phosphate, potassium phosphate, lithium sulfate, sodium sulfate, lithium perchlorate, sodium perchlorate, potassium perchlorate, lithium p-toluenesulfonate, sodium p-toluenesulfonate, potassium p-toluenesulfonate, lithium dodecylbenzenesulfonate, sodium dodecylbenzenesulfonate, and potassium dodecylbenzenesulfonate. Thereamong, from the standpoints of antistaticity and its persistence as well as safety for the living bodies and environment, for example, lithium p-toluenesulfonate, sodium p-toluenesulfonate, lithium dodecylbenzenesulfonate, and sodium dodecylbenzenesulfonate are preferred, and sodium dodecylbenzenesulfonate is more preferred.

The above-described alkali metal salt(s) may be incorporated into the antistatic agent of the present invention, or may be incorporated into a synthetic resin along with the antistatic agent of the present invention. From the standpoints of antistaticity and its persistence as well as storage stability, the amount of the alkali metal salt(s) to be incorporated is preferably 0.01 to 20 parts by mass, more preferably 0.1 to 15 parts by mass, most preferably 3.0 to 12 parts by mass, with respect to 100 parts by mass of the antistatic agent of the present invention.

Next, the ionic liquids will be described.

The ionic liquids are each, for example, a normal temperature-molten salt having a melting point of not higher than 100° C. and an initial electrical conductivity of 1 to 200 ms/cm, preferably 10 to 200 ms/cm, in which at least one cation or anion constituting the ionic liquid is an organic ion, and examples of such a normal temperature-molten salt include the one disclosed in WO95/15572.

The cation constituting the ionic liquid is, for example, one selected from the group consisting of amidinium, pyridinium, pyrazolium, and guanidinium cations. Thereamong, examples of the amidinium cation include the followings:

(1) imidazolinium cations those having 5 to 15 carbon atoms, such as 1,2,3,4-tetramethylimidazolinium and 1,3-dimethylimidazolinium;

(2) imidazolium cations those having 5 to 15 carbon atoms, such as 1,3-dimethylimidazolium and 1-ethyl-3-methylimidazolium;

(3) tetrahydropyrimidinium cations those having 6 to 15 carbon atoms, such as 1,3-dimethyl-1,4,5,6-tetrahydropyrimidinium and 1,2,3,4-tetramethyl-1,4,5,6-tetrahydropyrimidinium; and (4) dihydropyrimidinium cations those having 6 to 20 carbon atoms, such as 1,3-dimethyl-1,4-dihydropyrimidinium, 1,3-dimethyl-1,6-dihydropyrimidinium, 8-methyl-1,8-diazabicyclo[5,4,0]-7,9-undecadienium, and 8-methyl-1,8-diazabicyclo[5,4,0]-7,10-undecadienium.

Examples of the pyridinium cation include those having 6 to 20 carbon atoms, such as 3-methyl-1-propylpyridinium and 1-butyl-3,4-dimethylpyridinium.

Examples of the pyrazolium cation include those having 5 to 15 carbon atoms, such as 1,2-dimethylpyrazolium and 1-n-butyl-2-methylpyrazolium.

Examples of the guanidinium cation include the followings:

(1) guanidinium cations having an imidazolinium skeleton those having 8 to 15 carbon atoms, such as 2-dimethylamino-1,3,4-trimethylimidazolinium and 2-diethylamino-1,3,4-trimethylimidazolinium;

(2) guanidinium cations having an imidazolium skeleton those having 8 to 15 carbon atoms, such as 2-dimethylamino-1,3,4-trimethylimidazolium and 2-diethylamino-1,3,4-trimethylimidazolium;

(3) guanidinium cations having a tetrahydropyrimidinium skeleton those having 10 to 20 carbon atoms, such as 2-dimethylamino-1,3,4-trimethyl-1,4,5,6-tetrahydropyrimidinium and 2-diethylamino-1,3-dimethyl-4-ethyl-1,4,5,6-tetrahydropyrimidinium; and (4) guanidinium cations having a dihydropyrimidinium skeleton those having 10 to 20 carbon atoms, such as 2-dimethylamino-1,3,4-trimethyl-1,4-dihydropyrimidinium, 2-dimethylamino-1,3,4-trimethyl-1,6-dihydropyrimidinium, 2-diethylamino-1,3-dimethyl-4-ethyl-1,4-dihydropyrimidinium, and 2-diethylamino-1,3-dimethyl-4-ethyl-1,6-dihydropyrimidinium.

The above-described cations may be used individually, or two or more thereof may be used in combination. Thereamong, from the standpoints of antistaticity and its persistence, amidinium cations are preferred, imidazolium cations are more preferred, and 1-ethyl-3-methylimidazolium cation is particularly preferred.

In the ionic liquid, examples of the organic or inorganic acid constituting the anion include the followings. Examples of the organic acid include carboxylic acid, sulfuric acid ester, sulfonic acid and phosphate, and examples of the inorganic acid include superacids (e.g., fluoroboric acid, tetrafluoroboric acid, perchloric acid, hexafluorophosphoric acid, hexafluoroantimonic acid, and hexafluoroarsenic acid), phosphoric acid, and boric acid. These organic and inorganic acids may be used individually, or two or more thereof may be used in combination.

Among the above-described organic and inorganic acids, from the standpoints of the antistaticity and its persistence of the ionic liquid, acids forming a conjugate base of superacid or an anion other than a conjugate base of superacid, which allow the anion constituting the ionic liquid to have a Hammett acidity function ($-H_0$) of 12 to 100, and mixtures of such acids are preferred.

Examples of the anion other than a conjugate base of superacid include halogen (e.g., fluorine, chlorine, and bromine) ions, alkyl (C1 to C12) benzenesulfonic acid (e.g., p-toluenesulfonic acid and dodecylbenzenesulfonic acid) ions, and poly (n=1 to 25) fluoroalkanesulfonic acid (e.g., undecafluoropentanesulfonic acid) ions.

Examples of the superacid include those derived from a protonic acid or a combination of a protonic acid and a Lewis acid, and mixtures thereof. Examples of the protonic acid used as the superacid include bis(trifluoromethylsulfonyl)imidic acid, bis(pentafluoroethylsulfonyl)imidic acid, tris(trifluoromethylsulfonyl)methane, perchloric acid, fluorosulfonic acid, alkane (C1 to C30) sulfonic acids (e.g., methanesulfonic acid and dodecanesulfonic acid), poly (n=1 to 30) fluoroalkane (C1 to C30) sulfonic acids (e.g., trifluoromethanesulfonic acid, pentafluoroethanesulfonic acid, heptafluoropropanesulfonic acid, nonafluorobutanesulfonic acid, undecafluoropentanesulfonic acid, and tridecafluorohexanesulfonic acid), fluoroboric acid, and tetrafluoroboric acid. Thereamong, from the standpoint of the ease of synthesis, fluoroboric acid, trifluoromethanesulfonic acid, bis(trifluoromethanesulfonyl)imidic acid, and bis(pentafluoroethylsulfonyl)imidic acid are preferred.

Examples of the protonic acid used in combination with a Lewis acid include hydrogen halides (e.g., hydrogen fluoride, hydrogen chloride, hydrogen bromide, and hydrogen iodide), perchloric acid, fluorosulfonic acid, methanesulfonic acid, trifluoromethanesulfonic acid, pentafluoroethanesulfonic acid, nonafluorobutanesulfonic acid, undecafluoropentanesulfonic acid, tridecafluorohexanesulfonic acid, and mixtures thereof. Thereamong, hydrogen fluoride is preferred from the standpoint of the initial electrical conductivity of the ionic liquid.

Examples of the Lewis acid include boron trifluoride, phosphorus pentafluoride, antimony pentafluoride, arsenic pentafluoride, tantalum pentafluoride, and mixtures thereof. Thereamong, boron trifluoride and phosphorus pentafluoride are preferred from the standpoint of the initial electrical conductivity of the ionic liquid.

The combination of a protonic acid and a Lewis acid may be any combination, and examples of a superacid derived therefrom include tetrafluoroboric acid, hexafluorophosphoric acid, hexafluorotantalic acid, hexafluoroantimonic acid, hexafluorotantalum sulfonic acid, tetrafluoroboric acid, hexafluorophosphoric acid, chlorotrifluoroboric acid, hexafluoroarsenic acid, and mixtures thereof.

Among the above-described anions, from the standpoints of the antistaticity and its persistence of the ionic liquid, conjugate bases of superacids (superacids derived from a protonic acid and superacids derived from a combination of a protonic acid and a Lewis acid) are preferred, and superacids derived from a protonic acid and conjugate bases of superacids derived from a protonic acid, boron trifluoride and/or phosphorus pentafluoride are more preferred.

Among the above-described ionic liquids, from the standpoints of the antistaticity and its persistence of the ionic liquid, amidinium cation-containing ionic liquids are preferred, 1-ethyl-3-methylimidazolium cation-containing ionic liquids are more preferred, and 1-ethyl-3-methylimidazolium-bis(trifluoromethanesulfonyl)imide is particularly preferred.

The ionic liquid may be incorporated into the antistatic agent of the present invention, or may be incorporated into a synthetic resin along with the antistatic agent of the present invention. From the standpoints of antistaticity and its persistence as well as storage stability, the amount of the ionic liquid to be incorporated is preferably 0.01 to 20 parts by mass, more preferably 0.1 to 15 parts by mass, most preferably 1 to 12 parts by mass, with respect to 100 parts by mass of the antistatic agent of the present invention.

In the antistatic agent composition of the present invention, an alkali metal salt and an ionic liquid may be used in combination.

In order to obtain the antistatic agent composition of the present invention, the antistatic agent of the present invention and at least one selected from the group consisting of alkali metal salts and ionic liquids can be mixed with, as required, other optional components, and a variety of mixing machines can be employed for the mixing. The mixing may be performed with heating. Examples of the mixing machines that can be employed include tumbler mixers, Henschel mixers, ribbon blenders, V-type mixers, W-type mixers, super mixers, and Nauta mixers. Alternatively, at least one selected from the group consisting of alkali metal salts and ionic liquids may be added to the reaction system during the synthesis reaction of the polymer compound (E).

The antistatic agent of the present invention may also be used as an antistatic agent composition having antistaticity by incorporating thereto a Group II element salt within a range that does not impair the effects of the present invention. Examples of the Group II element salt include those of organic acids and inorganic acids, and examples of the Group II element include beryllium, magnesium, calcium, strontium, and barium. Examples of the organic acids include aliphatic monocarboxylic acids having 1 to 18 carbon atoms, such as formic acid, acetic acid, propionic acid, butyric acid, and lactic acid; aliphatic dicarboxylic acids having 1 to 12 carbon atoms, such as oxalic acid, malonic acid, succinic acid, fumaric acid, maleic acid, and adipic acid; aromatic carboxylic acids, such as benzoic acid, phthalic acid, isophthalic acid, terephthalic acid, and salicylic acid; and sulfonic acids having 1 to 20 carbon atoms, such as methanesulfonic acid, p-toluenesulfonic acid, dodecylbenzenesulfonic acid, and trifluoromethanesulfonic acid. Examples of the inorganic acids include hydrochloric acid, hydrobromic acid, sulfuric acid, sulfurous acid, phosphoric acid, phosphorous acid, polyphosphoric acid, nitric acid, and perchloric acid.

The Group II element salt may be incorporated into the antistatic agent of the present invention, or may be incorporated into a synthetic resin along with the antistatic agent of the present invention. The amount of the Group II element salt to be incorporated is preferably 0.01 to 20 parts by mass, more preferably 0.1 to 15 parts by mass, most preferably 3.0 to 12 parts by mass, with respect to 100 parts by mass of the antistatic agent of the present invention.

Further, the antistatic agent of the present invention may be used as an antistatic agent composition having antistaticity by incorporating thereto a surfactant within a range that does not impair the effects of the present invention. As the surfactant, a nonionic, anionic, cationic or amphoteric surfactant can be used. Examples of the nonionic surfactant include: polyethylene glycol-type nonionic surfactants, such as higher alcohol ethylene oxide adducts, fatty acid ethylene oxide adducts, higher alkylamine ethylene oxide adducts, and polypropylene glycol ethylene oxide adducts; and polyhydric alcohol-type nonionic surfactants, such as polyethylene oxides, glycerin fatty acid esters, pentaerythritol fatty acid esters, sorbitol or sorbitan fatty acid esters, polyhydric alcohol alkyl ethers, and alkanolamine aliphatic amides. Examples of the anionic surfactant include: carboxylates, such as alkali metal salts of higher fatty acids; sulfates, such as higher alcohol sulfates and higher alkyl ether sulfates; sulfonates, such as alkylbenzene sulfonates, alkyl sulfonates, and paraffin sulfonates; and phosphates, such as higher alcohol phosphates, and examples of the cationic surfactant include quaternary ammonium salts, such as alkyltrimethyl ammonium salts. Examples of the amphoteric surfactant include: amino acid-type amphoteric surfactants, such as higher alkyl aminopropionates; and betaine-type amphoteric surfactants, such as higher alkyl dimethylbetaines and higher alkyl dihydroxyethylbetaines. These surfactants may be used individually, or two or more thereof may be used in combination. In the antistatic agent composition of the present invention, among the above-exemplified surfactants, an anionic surfactant is preferred, and a sulfonate such as an alkylbenzene sulfonate, an alkylsulfonate, or a paraffin sulfonate is particularly preferred.

The surfactant may be incorporated into the antistatic agent of the present invention, or may be incorporated into a synthetic resin along with the antistatic agent of the present invention. The amount of the surfactant to be incorporated is preferably 0.01 to 20 parts by mass, more preferably 0.1 to 15 parts by mass, most preferably 1 to 10 parts by mass, with respect to 100 parts by mass of the antistatic agent of the present invention.

Still further, the antistatic agent of the present invention may be used as an antistatic agent composition having antistaticity by incorporating thereto a polymer-type antistatic agent within a range that does not impair the effects of the present invention. As the polymer-type antistatic agent, for example, a known polymer-type antistatic agent such as a polyether ester amide can be used, and examples thereof include the polyether ester amide disclosed in JPH07-10989A which contains a polyoxyalkylene adduct of bisphenol A. Further, a block polymer having 2 to 50 repeating structures each composed of a polyolefin block and a hydrophilic polymer block can also be used, and examples thereof include the block polymer disclosed in the specification of U.S. Pat. No. 6,552,131B1.

The polymer-type antistatic agent may be incorporated into the antistatic agent of the present invention, or may be incorporated into a synthetic resin along with the antistatic agent of the present invention. The amount of the polymer-type antistatic agent to be incorporated is preferably 0 to 50 parts by mass, more preferably 5 to 20 parts by mass, with respect to 100 parts by mass of the antistatic agent of the present invention.

Yet still further, the antistatic agent of the present invention may be used as an antistatic agent composition having antistaticity by incorporating thereto a compatibilizer within a range that does not impair the effects of the present invention. By incorporating a compatibilizer, the compatibility of the antistatic agent of the present invention with other components and synthetic resins can be improved. Examples of the compatibilizer include modified vinyl polymers having at least one functional group (polar group) selected from the group consisting of a carboxyl group, an epoxy group, an amino group, a hydroxy group and a polyoxyalkylene group, such as the polymer disclosed in JPH03-258850A, the sulfonyl group-containing modified vinyl polymer disclosed in JPH06-345927A and block polymers containing a polyolefin moiety and an aromatic vinyl polymer moiety.

Examples of a more preferred compatibilizer include acid anhydride-modified polyolefins, such as maleic anhydride-modified polyethylenes, maleic anhydride-modified polypropylenes, itaconic anhydride-modified polyethylenes, and itaconic anhydride-modified polypropylenes.

The compatibilizer may be incorporated into the antistatic agent of the present invention, or may be incorporated into a synthetic resin along with the antistatic agent of the present invention. The amount of the compatibilizer to be incorporated is preferably 0.1 to parts by mass, more preferably 1 to 10 parts by mass, with respect to 100 parts by mass of the antistatic agent of the present invention. In the antistatic agent composition of the present invention, in addition to the antistatic agent of the present invention and the above-described components, other components may be incorporated as optional components within a range that does not impair the effects of the present invention. These other components may be directly incorporated into the antistatic agent composition, or may be incorporated into a synthetic resin when the antistatic agent of the present invention or the antistatic agent composition of the present invention is incorporated into the synthetic resin such as a thermoplastic resin and used as a resin composition having antistaticity.

The antistatic agent and the antistatic agent composition of the present invention can each be incorporated into a synthetic resin, particularly preferably a thermoplastic resin, and the resultant can be used as an antistatic resin composition.

The antistatic resin composition of the present invention will now be described.

The resin composition of the present invention is obtained by incorporating the antistatic agent of the present invention or the antistatic agent composition of the present invention into a synthetic resin. The synthetic resin is preferably a thermoplastic resin.

Examples of the thermoplastic resin include: α-olefin polymers, such as polypropylenes, impact copolymer polypropylenes, high-density polyethylenes, low-density polyethylenes, linear low-density polyethylenes, cross-linked polyethylenes, ultrahigh-molecular-weight polyethylenes, polybutene-1, poly-3-methylpentene, and poly-4-methylpentene; polyolefin-based resins and copolymers thereof, such as ethylene-vinyl acetate copolymers, ethylene-ethyl acrylate copolymers, and ethylene-propylene copolymers; halogen-containing resins, such as polyvinyl chlorides, polyvinylidene chlorides, chlorinated polyethylenes, chlorinated polypropylenes, polyvinylidene fluorides, chlorinated rubbers, vinyl chloride-vinyl acetate copolymers, vinyl chloride-ethylene copolymers, vinyl chloride-vinylidene chloride copolymers, vinyl chloride-vinylidene chloride-vinyl acetate ternary copolymers, vinyl chloride-acrylate copolymers, vinyl chloride-maleate copolymers, and vinyl chloride-cyclohexylmaleimide copolymers; petroleum resins; coumarone resins; polystyrenes; high-impact polystyrenes; polyvinyl acetates; acrylic resins; copolymers (e.g., AS resins, ABS (acrylonitrile-butadiene-styrene copolymer) resins, ACS resins, SBS resins, MBS resins, and heat-resistant ABS resins) composed of styrene and/or α-methylstyrene with other monomer (e.g., maleic anhydride, phenylmaleimide, methyl methacrylate, butadiene, or acrylonitrile); polymethyl methacrylates; polyvinyl alcohols; polyvinyl formals; polyvinyl butyrals; aromatic polyesters, such as polyalkylene terephthalates (e.g., polyethylene terephthalate, polybutylene terephthalate, and polycyclohexane dimethylene terephthalate) and polyalkylene naphthalates (e.g., polyethylene naphthalate and polybutylene naphthalate); linear polyesters, such as polytetramethylene terephthalate; degradable aliphatic polyesters, such as polyhydroxybutyrate, polycaprolactone, polybutylene succinate, polyethylene succinate, polylactic acid, polymalic acid, polyglycolic acid, polydioxane, and poly(2-oxetanone); thermoplastic resins and blends thereof, such as polyamides (e.g., polyphenylene oxide, polycaprolactam, and polyhexamethylene adipamide), polycarbonates, polycarbonate/ABS resins, polycarbonate/polybutylene terephthalates, polybutylene terephthalate/ABS resins, branched polycarbonates, polyacetals, polyphenylene sulfides, polyurethanes, cellulose-based resins, polyimide resins, polysulfones, polyphenylene ethers, polyether ketones, polyether ether ketones, and liquid crystal polymers.

Further, the thermoplastic resin may be an elastomer, such as an isoprene rubber, a butadiene rubber, an acrylonitrile-butadiene copolymer rubber, a styrene-butadiene copolymer rubber, a fluorine rubber, a silicone rubber, an olefin-based elastomer, a styrene-based elastomer, a polyester-based elastomer, a nitrile-based elastomer, a nylon-based elastomer, a vinyl chloride-based elastomer, a polyamide-based elastomer, or a polyurethane-based elastomer. In the resin composition of the present invention, these thermoplastic resins may be used individually, or two or more thereof may be used in combination. These thermoplastic resins may be alloyed as well.

These thermoplastic resins can be used regardless of, for example, the molecular weight, the polymerization degree, the density, the softening point, the insoluble component-to-solvent ratio, the degree of stereoregularity, the presence or absence of a catalyst residue, the type and blend ratio of each monomer used as a raw material, and the type of a polymerization catalyst (e.g., a Ziegler catalyst or a metallocene catalyst). Among the above-described thermoplastic resins, from the standpoints of antistaticity and its persistence, at least one selected from the group consisting of polyolefin-based resins, polystyrene-based resins, and copolymers thereof are preferred.

In the resin composition of the present invention, the mass ratio of the synthetic resin and the antistatic agent of the present invention or the antistatic agent composition of the present invention is preferably in a range of 99/1 to 40/60.

A method of incorporating the antistatic agent of the present invention into a synthetic resin is not particularly restricted, and any commonly used method can be employed. For example, the antistatic agent of the present invention may be mixed and kneaded into the synthetic resin by roll kneading or bumper kneading, or using an extruder, a kneader or the like. The antistatic agent of the present invention may be directly added to the synthetic resin; however, as required, the antistatic agent of the present invention may be impregnated into a carrier before the addition. In order to impregnate the antistatic agent of the present invention into a carrier, the antistatic agent of the present invention and the carrier may be directly heat-mixed or, as required, a method in which the antistatic agent of the present invention is diluted with an organic solvent and then impregnated into the carrier and the solvent is subsequently removed may be employed. As the carrier, one which is known as a filler or bulking agent of a synthetic resin, or a flame retardant or light stabilizer that is solid at normal temperature can be used, and examples of such a carrier include calcium silicate powder, silica powder, talc powder, alumina powder, titanium oxide powder, and these carriers having a chemically modified surface, as well as the below-described flame retardants and antioxidants that are solid. Among these carriers, those having a chemically modified surface are preferred, and silica powder having a chemically modified surface is more preferred. These carriers have an average particle size of preferably 0.1 to 100 μm, more preferably 0.5 to 50 μm.

As a method of incorporating the antistatic agent of the present invention into a synthetic resin, the polymer compound (E) may be synthesized while kneading the block polymer (C) and the epoxy compound (D) containing two or more epoxy groups simultaneously with the synthetic resin and, in this process, at least one selected from the group consisting of alkali metal salts and ionic liquids may also be kneaded at the same time. Alternatively, the antistatic agent of the present invention may be mixed with the synthetic resin at the time of molding such as injection molding and, in this process, at least one selected from the group consisting of alkali metal salts and ionic liquids may be incorporated, or a masterbatch of the antistatic agent of the present invention and the synthetic resin, which has been produced in advance, may be incorporated and, in this process, at least one selected from the group consisting of alkali metal salts and ionic liquids may be incorporated as well.

In the resin composition of the present invention, as required, a variety of additives such as a phenolic antioxidant, a phosphorus-based antioxidant, a thioether-based antioxidant, an ultraviolet absorber, and a hindered amine-based light stabilizer may also be incorporated and, by this, the resin composition of the present invention can be stabilized.

These various additives such as antioxidants may be incorporated into the antistatic agent composition of the present invention before being incorporated into a synthetic resin. Alternatively, the additives may be incorporated during the production of the polymer compound (E). Particularly, the antioxidants are preferably incorporated during the production of the polymer compound (E) since oxidative degradation of the polymer compound (E) during the production can thereby be inhibited.

Examples of the phenolic antioxidant include 2,6-di-tert-butyl-p-cresol, 2,6-diphenyl-4-octadecyloxyphenol, distearyl(3,5-di-tert-butyl-4-hydroxybenzyl)phosphonate, 1,6-hexamethylene-bis[(3,5-di-tert-butyl-4-hydroxyphenyl) promionic acid amide], 4,4'-thiobis(6-tert-butyl-m-cresol), 2,2'-methylene-bis(4-methyl-6-tert-butylphenol), 2,2'-methylene-bis(4-ethyl-6-tert-butylphenol), 4,4'-butylidene-bis(6-tert-butyl-m-cresol), 2,2'-ethylidene-bis(4,6-di-tert-butylphenol), 2,2'-ethylidene-bis(4-sec-butyl-6-tert-butylphenol), 1,1,3-tris(2-methyl-4-hydroxy-5-tert-butylphenyl)butane, 1,3,5-tris(2,6-dimethyl-3-hydroxy-4-tert-butylbenzyl)isocyanurate, 1,3,5-tris(3,5-di-tert-butyl-4-hydroxybenzyl)isocyanurate, 1,3,5-tris(3,5-di-tert-butyl-4-hydroxybenzyl)-2,4,6-trimethylbenzene, 2-tert-butyl-4-methyl-6-(2-acryloyloxy-3-tert-butyl-5-methylbenzyl) phenol, stearyl(3,5-di-tert-butyl-4-hydroxyphenyl) propionate, tetrakis[3-(3,5-di-tert-butyl-4-hydroxyphenyl) propionic acid methyl]methane, thiodiethylene glycol-bis [(3,5-di-tert-butyl-4-hydroxyphenyl)propionate], 1,6-hexamethylene-bis[(3,5-di-tert-butyl-4-hydroxyphenyl) propionate], bis[3,3-bis(4-hydroxy-3-tert-butylphenyl) butyric acid]glycol ester, bis[2-tert-butyl-4-methyl-6-(2-hydroxy-3-tert-butyl-5-methylbenzyl)phenyl]terephthalate, 1,3,5-tris[(3,5-di-tert-butyl-4-hydroxyphenyl)propionyloxyethyl]isocyanurate, 3,9-bis[1,1-dimethyl-2-{(3-tert-butyl-4-hydroxy-5-methylphenyl)propionyloxy}ethyl]-2,4,8,10-tetraoxaspiro[5,5]undecane, and triethylene glycol-bis[(3-tert-butyl-4-hydroxy-5-methylphenyl)propionate]. These phenolic antioxidants are added in an amount of preferably 0.001 to 10 parts by mass, more preferably 0.05 to 5 parts by mass, with respect to 100 parts by mass of the synthetic resin.

Examples of the phosphorus-based antioxidant include trisnonylphenyl phosphite, tris[2-tert-butyl-4-(3-tert-butyl-4-hydroxy-5-methylphenylthio)-5-methylphenyl]phosphite, tridecyl phosphite, octyldiphenyl phosphite, di(decyl)monophenyl phosphite, di(tridecyl)pentaerythritol diphosphite, di(nonylphenyl)pentaerythritol diphosphite, bis(2,4-di-tert-butylphenyl)pentaerythritol diphosphite, bis(2,6-di-tertbutyl-4-methylphenyl)pentaerythritol diphosphite, bis(2,4,6-tri-tert-butylphenyl)pentaerythritol diphosphite, bis(2,4-dicumylphenyl)pentaerythritol diphosphite, tetra(tridecyl) isopropylidenediphenol diphosphite, tetra(tridecyl)-4,4'-n-butylidene-bis(2-tert-butyl-5-methylphenol)diphosphite, hexa(tridecyl)-1,1,3-tris(2-methyl-4-hydroxy-5-tert-butylphenyl)butane triphosphite, tetrakis(2,4-di-tert-butylphenyl)biphenylene diphosphonite, 9,10-dihydro-9-oxa-10-phosphaphenanthrene-10-oxide, 2,2'-methylene-bis(4,6-tert-butylphenyl)-2-ethylhexyl phosphite, 2,2'-methylene-bis(4,6-tert-butylphenyl)-octadecyl phosphite, 2,2'-ethylidene-bis(4,6-di-tert-butylphenyl)fluorophosphite, tris(2-[(2,4,8,10-tetrakis-tert-butyldibenzo[d,f][1,3,2]dioxaphosphepin-6-yl)oxy]ethyl)amine, and phosphite of 2-ethyl-2-butylpropylene glycol and 2,4,6-tri-tert-butylphenol. These phosphorus-based antioxidants are added in an amount of preferably 0.001 to 10 parts by mass, more preferably 0.05 to 5 parts by mass, with respect to 100 parts by mass of the synthetic resin.

Examples of the thioether-based antioxidant include: dialkyl thiodipropionates, such as dilauryl thiodipropionate, dimyristyl thiodipropionate, and distearyl thiodipropionate; and pentaerythritol tetrakis(β-alkylmercaptopropionate)s. These thioether-based antioxidants are added in an amount of preferably 0.001 to 10 parts by mass, more preferably 0.05 to 5 parts by mass, with respect to 100 parts by mass of the synthetic resin.

Examples of the ultraviolet absorber include: 2-hydroxybenzophenones, such as 2,4-dihydroxybenzophenone, 2-hydroxy-4-methoxybenzophenone, 2-hydroxy-4-octoxybenzophenone, and 5,5'-methylene-bis(2-hydroxy-4-methoxybenzophenone); 2-(2'-hydroxyphenyl) benzotriazoles, such as 2-(2'-hydroxy-5'-methylphenyl) benzotriazole, 2-(2'-hydroxy-3',5'-di-tert-butylphenyl)-5-chlorobenzotriazole, 2-(2'-hydroxy-3'-tert-butyl-5'-methylphenyl)-5-chlorobenzotriazole, 2-(2'-hydroxy-5'-tert-octylphenyl)benzotriazole, 2-(2'-hydroxy-3',5'-dicumylphenyl)benzotriazole, 2,2'-methylene-bis(4-tert-octyl-6-(benzotriazolyl)phenol), and 2-(2'-hydroxy-3'-tert-butyl-5'-carboxyphenyl)benzotriazole; benzoates, such as phenyl salicylate, resorcinol monobenzoate, 2,4-di-tert-butylphenyl-3,5-di-tert-butyl-4-hydroxybenzoate, 2,4-di-tert-amylphenyl-3,5-di-tert-butyl-4-hydroxybenzoate, and hexadecyl-3,5-di-tert-butyl-4-hydroxybenzoate; substituted oxanilides, such as 2-ethyl-2'-ethoxyoxanilide and 2-ethoxy-4'-dodecyloxanilide; cyanoacrylates, such as ethyl-α-cyano-β,β-diphenylacrylate and methyl-2-cyano-3-methyl-3-(p-methoxyphenyl)acrylate; and triaryltriazines, such as 2-(2-hydroxy-4-octoxyphenyl)-4,6-bis(2,4-di-tert-butylphenyl)-s-triazine, 2-(2-hydroxy-4-methoxyphenyl)-4,6-diphenyl-s-triazine, and 2-(2-hydroxy-4-propoxy-5-methylphenyl)-4,6-bis(2,4-di-tert-butylphenyl)-s-triazine. These ultraviolet absorbers are added in an amount of preferably 0.001 to 30 parts by mass, more preferably 0.05 to 10 parts by mass, with respect to 100 parts by mass of the synthetic resin.

Examples of the hindered amine-based light stabilizer include hindered amine compounds, such as 2,2,6,6-tetramethyl-4-piperidyl stearate, 1,2,2,6,6-pentamethyl-4-piperidyl stearate, 2,2,6,6-tetramethyl-4-piperidyl benzoate, bis(2,2,6,6-tetramethyl-4-piperidyl)sebacate, bis(1,2,2,6,6-pentamethyl-4-piperidyl)sebacate, bis(1-oxtoxy-2,2,6,6-tetramethyl-4-piperidyl)sebacate, tetrakis(2,2,6,6-tetramethyl-4-piperidyl)-1,2,3,4-butanetetracarboxylate, tetrakis(1,2,2,6,6-pentamethyl-4-piperidyl)-1,2,3,4-butanetetracarboxylate, bis(2,2,6,6-tetramethyl-4-piperidyl)-bis(tridecyl)-1,2,3,4-butanetetracarboxylate, bis(1,2,2,6,6-pentamethyl-4-piperidyl)-bis(tridecyl)-1,2,3,4-butanetetracarboxylate, bis(1,2,2,6,6-pentamethyl-4-piperidyl)-2-butyl-2-(3,5-di-tert-butyl-4-hydroxybenzyl) malonate, 1,2,2,6,6-pentamethyl-4-piperidyl methacrylate, poly[{6-(1,1,3,3-tetramethylbutyl)amino-1,3,5-triazine-2,4-diyl}{(2,2,6,6-tetramethyl-4-piperidyl) imino}hexamethylene{(2,2,6,6-tetramethyl-4-piperidyl) imino}], 1,2,3,4-butanecarboxylic acid/2,2-bis(hydroxymethyl)-1,3-propanediol/3-hydroxy-2,2-dimethylpropanal/1,2,2,6,6-pentamethyl-4-piperidinyl ester poly condensates, bis(1,2,2,6,6-pentamethyl-4-piperidyl) =decane dioate/methyl=1,2,2,6,6-pentamethyl-4-piperidyl=sebacate mixture, 2,2,6,6-tetramethyl-4-piperidyl methacrylate, 1-(2-hydroxyethyl)-2,2,6,6-tetramethyl-4-piperidinol/diethyl succinate polycondensates, 1,6-bis(2,2,6,6-tetramethyl-4-piperidylamino)hexane/dibromoethane polycondensates, 1,6-bis(2,2,6,6-tetramethyl-4-piperidylamino)hexane/2,4-dichloro-6-morpholino-s-triazine polycondensates, 1,6-bis(2,2,6,6-tetramethyl-4-piperidylamino) hexane/2,4-dichloro-6-tert-octylamino-s-triazine polycondensates, 1,5,8,12-tetrakis[2,4-bis(N-butyl-N-(2,2,6,6-tetramethyl-4-piperidyl)amino)-s-triazine-6-yl]-1,5,8,12-tetraazadodecane, 1,5,8,12-tetrakis[2,4-bis(N-butyl-N-(1,2,2,6,6-pentamethyl-4-piperidyl)amino)-s-triazine-6-yl]-1,5,8,12-tetraazadodecane, 1,6,11-tris[2,4-bis(N-butyl-N-(2,2,6,6-tetramethyl-4-piperidyl)amino)-s-triazine-6-ylamino] undecane, 1,6,11-tris[2,4-bis(N-butyl-N-(1,2,2,6,6-pentamethyl-4-piperidyl)amino)-s-triazine-6-ylamino] undecane, 3,9-bis[1,1-dimethyl-2-{tris(2,2,6,6-tetramethyl-4-piperidyloxycarbonyl)butylcarbonyloxy}ethyl]-2,4,8,10-tetraoxaspiro[5.5]undecane, 3,9-bis[1,1-dimethyl-2-{tris(1,2,2,6,6-pentamethyl-4-piperidyloxycarbonyl) butylcarbonyloxy}ethyl]-2,4,8,10-tetraoxaspiro[5.5] undecane, bis(1-undecyloxy-2,2,6,6-tetramethylpiperidin-4-yl)carbonate, 2,2,6,6-tetramethyl-4-piperidyl hexadecanoate, and 2,2,6,6-tetramethyl-4-piperidyl octadecanoate. These hindered amine-based light stabilizers are added in an amount of preferably 0.001 to 30 parts by mass, more preferably 0.05 to 10 parts by mass, with respect to 100 parts by mass of the synthetic resin.

When a polyolefin-based resin is used as the synthetic resin, for the purpose of neutralizing a residual catalyst in the polyolefin-based resin, it is preferred to add a known neutralizer as required within a range that does not impair the effects of the present invention. Examples of the neutralizer include: fatty acid metal salts, such as calcium stearate, lithium stearate, and sodium stearate; and fatty acid amide compounds, such as ethylene-bis(stearamide), ethylene-bis(12-hydroxystearamide) and stearic acid amide, and these neutralizers may be used as a mixture.

In the resin composition of the present invention, as other additive(s), for example, a nucleating agent, such as an aromatic metal carboxylate, an alicyclic metal alkyl carboxylate, p-tert-butylbenzoate aluminum salt, an aromatic phosphate metal salt or a dibenzylidene sorbitol, a metallic soap, a hydrotalcite, a triazine ring-containing compound, a metal hydroxide, a phosphoric acid ester-based flame retardant, a condensed phosphate-based flame retardant, a phosphate-based flame retardant, an inorganic phosphorus-based flame retardant, a (poly)phosphate-based flame retardant, a halogen-based flame retardant, a silicon-based flame retardant, an antimony oxide such as antimony trioxide, other inorganic flame retardant aid, other organic flame retardant aid, a filler, a pigment, a lubricant, a processing aid, a plasticizer, a reinforcing material, an age inhibitor, a wood flour, and/or a foaming agent may also be incorporated as required within a range that does not impair the effects of the present invention.

Examples of the triazine ring-containing compound include melamine, ammeline, benzoguanamine, acetoguanamine, phthalodiguanamine, melamine cyanurate, melamine pyrophosphate, butylene diguanamine, norbomene diguanamine, methylene diguanamine, ethylene dimelamine, trimethylene dimelamine, tetramethylene dimelamine, hexamethylene dimelamine, and 1,3-hexylene dimelamine.

Examples of the metal hydroxide include magnesium hydroxide, aluminum hydroxide, calcium hydroxide, barium hydroxide, zinc hydroxide, and KISUMA 5A (magnesium hydroxide manufactured by Kyowa Chemical Industry Co., Ltd.).

Examples of the phosphoric acid ester-based flame retardant include trimethyl phosphate, triethyl phosphate, tributyl phosphate, tributoxyethyl phosphate, trischloroethyl phosphate, trisdichloropropyl phosphate, triphenyl phosphate, tricresyl phosphate, cresyldiphenyl phosphate, trixylenyl phosphate, octyldiphenyl phosphate, xylenyldiphenyl phosphate, tris(isopropylphenyl)phosphate, 2-ethylhexyldiphenyl phosphate, t-butylphenyldiphenyl phosphate, bis(t-butylphenyl)phenyl phosphate, tris(t-butylphenyl) phosphate, isopropylphenyldiphenyl phosphate, bis(isopropylphenyl)diphenyl phosphate, and tris(isopropylphenyl)phosphate.

Examples of the condensed phosphate-based flame retardant include 1,3-phenylene-bis(diphenylphosphate), 1,3-phenylene-bis(dixylenylphosphate), and bisphenol A-bis(diphenylphosphate).

Examples of the (poly)phosphate-based flame retardant include ammonium salts and amine salts of (poly)phosphoric acid, such as ammonium polyphosphate, melamine polyphosphate, piperazine polyphosphate, melamine pyrophosphate, and piperazine pyrophosphate.

Examples of the above-described other inorganic flame retardant aid include: inorganic compounds, such as titanium oxide, aluminum oxide, magnesium oxide, hydrotalcite, talc, and montmorillonite; and surface-treated products thereof. For example, a variety of commercially available products, such as TIPAQUE R-680 (titanium oxide: manufactured by Ishihara Sangyo Kaisha, Ltd.), KYOWAMAG 150 (magnesium oxide: manufactured by Kyowa Chemical Industry Co., Ltd.), DHT-4A (hydrotalcite: manufactured by manufactured by Kyowa Chemical Industry Co., Ltd.) and ALCAMIZER 4 (zinc-modified hydrotalcite: manufactured by manufactured by Kyowa Chemical Industry Co., Ltd.), can be used. Examples of the above-described other organic flame retardant aid include pentaerythritol.

Examples of the age inhibitor include naphthylamine-based age inhibitors, diphenylamine-based age inhibitors, p-phenyldiamine-based age inhibitors, quinoline-based age inhibitors, hydroquinone derivatives, monophenol-based age inhibitors, thiobisphenol-based age inhibitors, hindered phenol-based age inhibitors, and phosphite-based age inhibitors.

Examples of the nucleating agent include inorganic nucleating agents and organic nucleating agents, and specific examples of the inorganic nucleating agents include kaolinite, synthetic mica, clay, zeolite, silica, graphite, carbon black, magnesium oxide, titanium oxide, calcium sulfide, boron nitride, calcium carbonate, barium sulfate, aluminum oxide, neodymium oxide, and metal salts of phenylphosphonate. These inorganic nucleating agents may be modified with an organic substance so as to improve their dispersion in the composition.

Specific examples of the organic nucleating agents include: organic metal carboxylates, such as sodium benzoate, potassium benzoate, lithium benzoate, calcium benzoate, magnesium benzoate, barium benzoate, lithium terephthalate, sodium terephthalate, potassium terephthalate, calcium oxalate, sodium laurate, potassium laurate, sodium myristate, potassium myristate, calcium myristate, sodium octacosanoate, calcium octacosanoate, sodium stearate, potassium stearate, lithium stearate, calcium stearate, magnesium stearate, barium stearate, sodium montanate, calcium montanate, sodium toluate, sodium salicylate, potassium salicylate, zinc salicylate, aluminum dibenzoate, potassium dibenzoate, lithium dibenzoate, sodium p-naphthalate, and sodium cyclohexane carboxylate; organic sulfonates, such as sodium p-toluene sulfonate and sodium sulfoisophthalate; carboxylic acid amides, such as stearic acid amide, ethylene-bis-lauric acid amide, palmitic acid amide, hydroxystearic acid amide, erucic acid amide, and trimesic acid tris(t-butylamide); benzylidene sorbitol and derivatives thereof; phosphorus compound metal salts, such as sodium-2,2'-methylene-bis(4,6-di-t-butylphenyl)phosphate; and 2,2-methylbis(4,6-di-t-butylphenyl)sodium.

Examples of the lubricant include: pure hydrocarbon-based lubricants, such as liquid paraffins, natural paraffins, microwaxes, synthetic paraffins, low-molecular-weight polyethylenes, and polyethylene waxes; halogenated hydrocarbon-based lubricants; fatty acid-based lubricants, such as higher fatty acids and oxy fatty acids; fatty acid amide-based lubricants, such as fatty acid amides and bis-fatty acid amides; ester-based lubricants, such as lower alcohol esters of fatty acids, polyhydric alcohol esters of fatty acids (e.g., glyceride), polyglycol esters of fatty acids, and fatty alcohol esters of fatty acids (ester waxes); metallic soaps; fatty alcohols; polyhydric alcohols; polyglycols; polyglycerols; partial esters composed of a fatty acid and a polyhydric alcohol; partial ester-based lubricants composed of a fatty acid, a polyglycol, and a polyglycerol; silicone oils; and mineral oils.

The processing aid is, for example, an acrylic processing aid, and one obtained by polymerizing a single kind of (meth)acrylic acid ester or copolymerizing two or more kinds of (meth)acrylic acid esters can be used as the acrylic processing aid. Examples of the (meth)acrylic acid ester(s) to be polymerized or copolymerized include (meth)acrylates, such as methyl acrylate, methyl methacrylate, ethyl acrylate, ethyl methacrylate, n-propyl acrylate, isopropyl acrylate, n-propyl methacrylate, isopropyl methacrylate, n-butyl acrylate, isobutyl acrylate, t-butyl methacrylate, n-hexyl acrylate, n-hexyl methacrylate, 2-ethylhexyl acrylate, 2-ethylhexyl methacrylate, dodecyl methacrylate, and tridecyl methacrylate. Other examples include (meth)acrylic acid and hydroxy group-containing (meth)acrylates.

Examples of the plasticizer include polyester-based plasticizers, glycerol-based plasticizers, polycarboxylic acid ester-based plasticizers, polyalkylene glycol-based plasticizers, ether ester-based plasticizers, and epoxy-based plasticizers.

Examples of the reinforcing material include: inorganic fibrous reinforcing materials, such as glass fibers, asbestos fibers, carbon fibers, graphite fibers, metal fibers, potassium titanate whiskers, aluminum borate whiskers, magnesium-based whiskers, silicon-based whiskers, wollastonite, sepiolite, asbestos, slag fibers, zonolite, ellestadite, gypsum fibers, silica fibers, silica-alumina fibers, zirconia fibers, boron nitride fibers, silicon nitride fibers, and boron fibers; organic fibrous reinforcing materials, such as polyester fibers, nylon fibers, acrylic fibers, regenerated cellulose fibers, acetate fibers, kenaf, ramie, cotton, jute, hemp, sisal, flax, linen, silk, Manila hemp, sugarcane, wood pulp, wastepaper, recycled wastepaper, and wool; and plate-form and particle-form reinforcing materials, such as glass flakes, non-swelling mica, graphites, metal foils, ceramic beads, clay, mica, sericite, zeolite, bentonite, dolomite, kaolin, fine powder silicic acid, feldspar powder, potassium titanate, shirasu balloon, calcium carbonate, magnesium carbonate, barium sulfate, calcium oxide, aluminum oxide, titanium oxide, aluminum silicate, silicon oxide, gypsum, novaculite, dawsonite, and white clay. These reinforcing materials may be coated or bundled with a thermoplastic resin such as an ethylene-vinyl acetate copolymer or a thermosetting resin such as an epoxy resin, or may be treated with a coupling agent such as aminosilane or epoxysilane.

Examples of the filler include talc, calcium carbonate, magnesium sulfate fibers, silica, clay, kaolin, alumina, carbon black, and glass fibers. These fillers may be subjected to a treatment such as pulverization into fine powder or micronization into fine particles, or a surface treatment.

The wood flour is incorporated for the purpose of imparting a woodgrain pattern and a woody texture of a natural wood material to a molded article obtained from the resin composition and thereby providing the molded article with a color tone and a texture that are similar to those of a natural wood material so that the molded article is used for the applications such as vehicle interior materials, building materials (e.g., side moldings, residential interior materials, and exterior materials), floor materials of terraces, balconies, decks and the like, civil engineering materials, boardwalks over wetlands and the like in natural parks, handrails produced by covering steel pipes, table frames, and gaskets. The wood flour has an average particle size of preferably 30 to 500 μm, more preferably 100 to 200 μm. An average particle size of larger than 500 μm is not preferred since it tends to deteriorate the surface state of the molded article. The type of wood to be used for the wood flour is not particularly restricted and, for example, a coniferous tree such as Japanese cedar, lauan, southern Japanese hemlock, or Japanese cypress is preferred. Depending on the purpose of the use, a wood flour obtained from a broad-leaved tree can also be used. Further, a wood flour obtained by pulverizing sawdust, chaff, powder generated by polishing the surface of a particle board, or the like can be used as well. A method of making the wood flour into fine powder is not particularly restricted and, for example, a method of pulverizing a chipped wood material using a dry pulverizer may be employed.

In addition to the above, in the resin composition of the present invention, additives that are usually used in synthetic resins, examples of which include a cross-linking agent, an anti-fogging agent, a plate-out inhibitor, a surface treatment agent, a flame retardant other than the above-exemplified ones, a fluorescent agent, an antifungal agent, an antibacterial agent, a metal inactivator, a mold release agent, a pigment, an antioxidant other than the above-exemplified ones, and a light stabilizer other than the above-exemplified ones may be incorporated as required within a range that does not impair the effects of the present invention.

The additives to be incorporated into the resin composition of the present invention may be directly added to the synthetic resin, or may be incorporated into the antistatic agent or antistatic agent composition of the present invention, which is subsequently added to the synthetic resin.

A resin molded article having antistaticity can be obtained by molding the resin composition of the present invention. A molding method is not particularly restricted, and examples thereof include extrusion processing, calender processing, injection molding, rolling, compression molding, blow molding, and rotational molding. Molded articles of various shapes, such as resin plates, sheets, films, bottles, fibers and special shape articles, can be produced by these methods. Such molded articles obtained from the resin composition of the present invention exhibits excellent antistatic performance with excellent persistence.

The resin composition of the present invention and molded articles thereof can be used in a wide range of industrial fields, including the fields of electricity/electronics/communication, agriculture/forestry/fisheries, mining, construction, food, textiles, clothing, health care, coal, petroleum, rubber, leather, automobiles, precision instruments, wood materials, building materials, civil engineering, furniture, printing, and musical instruments.

More specifically, the resin composition of the present invention and molded articles thereof can be applied to, for example, office supplies and office-automation equipment, such as printers, personal computers, word processors, keyboards, PDA (Personal Digital Assistant) devices, telephones, copy machines, facsimile machines, ECRs (electronic cash registers), electronic calculators, electronic organizers, cards, holders, and stationery; home electric appliances, such as laundry machines, refrigerators, vacuum cleaners, microwave ovens, lighting fixtures, gaming machines, irons, and foot warmers; audio-visual equipment, such as TVs, video tape recorders, video cameras, radio-cassette players, tape recorders, mini discs, CD players, speakers, and liquid crystal displays; electric/electronic components and communication devices, such as connectors, relays, capacitors, switches, printed circuit boards, coil bobbins, semiconductor sealing materials, LED sealing materials, electric wires, cables, transformers, deflection yokes, distribution boards, and clocks; automobile interior and exterior materials; platemaking films; adhesive films; bottles; food containers; food packaging films; pharmaceutical and medical wrapping films; product packaging films; agricultural films; agricultural sheets; and greenhouse films.

Moreover, the resin composition of the present invention and molded articles thereof can also be used in other various applications, including: materials of automobiles, vehicles, ships, airplanes, buildings and houses, as well as construction and civil engineering materials, such as seats (e.g., stuffing and cover materials), belts, ceiling covers, convertible tops, armrests, door trims, rear package trays, carpets, mats, sun visors, wheel covers, mattress covers, air-bags, insulating materials, straps, strap belts, wire coating materials, electric insulating materials, paints, coating materials, veneer materials, floor materials, baffle walls, carpets, wallpapers, wall decorating materials, exterior materials, interior materials, roof materials, deck materials, wall materials, pillar materials, floor boards, fence materials, framing and moulding materials, window and door-shaping materials, shingle boards, sidings, terraces, balconies, soundproof boards, heat insulating boards, and window materials; and household articles and sporting goods, such as clothing materials, curtains, sheets, non-woven fabrics, plywood boards, synthetic fiber boards, rugs, doormats, leisure sheets, buckets, hoses, containers, eye glasses, bags, casings, goggles, ski boards, rackets, tents, and musical instruments.

Examples

The present invention will now be described in more detail by way of Examples thereof; however, the present invention is not restricted thereto.

In accordance with the below-described Production Examples, polymer compounds (E), which are each the antistatic agent of the present invention, were produced. In the below-described Production Examples, the number-average molecular weight of a compound (b) was determined by the below-described <Method of Calculating Number-Average Molecular Weight from Hydroxyl Value>, and the number-average molecular weights of components other than the compound (b) were determined by the below-described <Method of Measuring Number-Average Molecular Weight in Terms of Polystyrene>.

<Method of Calculating Number-Average Molecular Weight from Hydroxyl Value>

The hydroxyl value was measured by the below-described hydroxyl value measurement method, and the number-average molecular weight was determined by the following equation:

$$\text{Number-average molecular weight}=(56{,}110\times2)/\text{hydroxyl value}$$

<Hydroxyl Value Measurement Method>

Reagent A (Acetylating Agent)

(1) triethyl phosphate: 1,560 mL (2) acetic anhydride: 193 mL (3) perchloric acid (60%): 16 g The reagent A was obtained by mixing the materials in the order of (1)→(2)→(3).

Reagent B

Pyridine and pure water were mixed at a volume ratio of 3:1.

Reagent C

Two to three droplets of a phenolphthalein solution was added to 500 mL of isopropyl alcohol, and the resultant was neutralized with a 1N KOH aqueous solution.

First, 2 g of a sample was weighed in a 200-mL Erlenmeyer flask, 10 mL of triethyl phosphate was added thereto, and the sample was dissolved with heating. Then, 15 mL of the reagent A was added, and the flask was sealed with a stopper and vigorously shaken. Subsequently, 20 mL of the reagent B was added, and the flask was sealed with a stopper and vigorously shaken, followed by an addition of 50 mL of the reagent C. The resultant was titrated with a 1N KOH aqueous solution to calculate the hydroxyl value using the following equation:

$$\text{Hydroxyl value [mg KOH/g]}=56.11\times f\times(T-B)/S$$

f: factor of 1N KOH aqueous solution

B: titer in blank test [mL]

T: titer in main test [mL]

S: sample amount [g]

<Method of Measuring Number-Average Molecular Weight in Terms of Polystyrene>

The number-average molecular weight was measured by gel permeation chromatography (GPC). The Mn measurement conditions were as follows.

Apparatus: GPC apparatus, manufactured by JASCO Corporation

Solvent: chloroform

Standard substance: polystyrene

Detector: differential refractometer (RI detector)

Column stationary phase: SHODEX LF-804, manufactured by Showa Denko K.K.

Column temperature: 40° C.

Sample concentration: 1 mg/1 mL

Flow rate: 0.8 mL/min

Injection volume: 100 μL

Production Example 1

In a separable flask, 122 g (1.35 mol) of 1,4-butanediol and 168 g (1.42 mol) of succinic acid were polymerized for 3 hours under normal pressure in the presence of 0.2 g of an antioxidant (tetrakis[3-(3,5-di-tert-butyl-4-hydroxyphenyl) propionyloxymethyl]methane: ADK STAB AO-60, manufactured by ADEKA Corporation) with the temperature being slowly increased from 140° C. to 190° C., whereby a polyester (a)-1 was obtained. This polyester (a)-1 had a number-average molecular weight of 3,000.

Next, 250 g of the thus obtained polyester (a)-1, 160 g of a polyethylene glycol having a number-average molecular weight of 3,300 and 75 ethyleneoxy group repeating units as a compound (b)-1 having hydroxy groups at both ends, 0.2 g of an antioxidant (ADK STAB AO-60), and 0.4 g of zirconium octylate were added and polymerized at 200° C. for 3 hours under reduced pressure to obtain 400 g of a block polymer (C)-1 having a structure containing carboxyl groups at both ends. This block polymer (C)-1 having a structure containing carboxyl groups at both ends had a number-average molecular weight (Mn) of 16,500.

To 400 g of the thus obtained block polymer (C)-1 having a structure containing carboxyl groups at both ends, 3 g of bisphenol F diglycidyl ether (epoxy equivalent: 170 g/eq) was added as an epoxy compound (D)-1 containing two or more epoxy groups, and these materials were polymerized at 220° C. for 5 hours under reduced pressure, after which the resultant was extruded at 220° C. using LABO-PLASTOMILL p (manufactured by Toyo Seiki Seisaku-sho, Ltd.) and cut into 5 mm-square pellets, whereby a polymer compound (E)-1, which is the antistatic agent of the present invention, was obtained as 400 g of pellets. The crystallization temperature of the thus obtained pellets was measured by the below-described <Crystallization Temperature Measurement Method>. The result thereof is shown in Table 1.

In addition, 15 g of the thus obtained pellets (number of pellets=about 2,000) were sampled, and visually classified into pellets having a favorable shape (5 mm-square shape) and other pellets having a defective shape. The ratio (% by mass) of the pellets having a defective shape with respect to all pellets was calculated to evaluate the productivity (cutting property). The pellets having a defective shape included pellets in a state where some of them were connected with each other without being completely cut, pellets having rough surfaces, and pellets observed with burrs and/or cracks. It is deemed that the lower the ratio of the pellets having a defective shape, the superior is the cutting property and the higher is the productivity.

Further, the storage stability of the thus obtained pellets was evaluated by the below-described <Method for Testing Storage Stability of Antistatic Agent>.

<Crystallization Temperature Measurement Method>

The crystallization temperature was measured using a differential scanning calorimeter (DIAMOND DSC, manufactured by PerkinElmer Co., Ltd.). Sample pellets were cut into fine pieces, and 3±1 mg thereof was weighed in an aluminum pan, heated from room temperature (25° C.) to 130° C. at a rate of 10° C./min, maintained for 5 minutes, and then cooled to 0° C. at a rate of 10° C./min to obtain a chart. In this chart, the temperature of an endothermic peak top was defined as the crystallization temperature.

<Method for Testing Storage Stability of Antistatic Agent>

In a 130-mL glass sample vial, 5 g of the pellets were placed, and this sample vial was left to stand for 1 hour in an 80° C. oven. After 1 hour, the sample vial was taken out, capped, and then gently inverted, and the blocking property was evaluated based on how the antistatic agent pellets fell.

○: All of the antistatic agent pellets fell without adhering to the bottom of the vial. The storage stability is evaluated as excellent.

Δ: Some of the antistatic agent pellets were left adhered to the bottom of the vial. The storage stability is evaluated as slightly poor.

x: All of the antistatic agent pellets were left adhered to the bottom of the vial. The storage stability is evaluated as poor.

Production Example 2

To 400 g of the block polymer (C)-1 obtained in the same manner as in Production Example 1, 4 g of hydrogenated bisphenol A diglycidyl ether (epoxy equivalent: 215 g/eq) was added as an epoxy compound (D)-2 containing two or more epoxy groups, and these materials were polymerized at 220° C. for 5 hours under reduced pressure, after which a polymer compound (E)-2, which is the antistatic agent of the present invention, was obtained as 400 g of pellets in the same manner as in Production Example 1.

The crystallization temperature of the thus obtained pellets of the polymer compound (E)-2 was measured in the same manner as in Production Example 1. Further, the productivity (cutting property) and the storage stability of the antistatic agent were evaluated. The results thereof are shown in Table 1.

Production Example 3

To 400 g of the block polymer (C)-1 obtained in the same manner as in Production Example 1, 3 g of dicyclopentadiene dimethanol diglycidyl ether (epoxy equivalent: 170 g/eq) was added as an epoxy compound (D)-3 containing two or more epoxy groups, and these materials were polymerized at 220° C. for 5 hours under reduced pressure, after which a polymer compound (E)-3, which is the antistatic agent of the present invention, was obtained as 400 g of pellets in the same manner as in Production Example 1. The crystallization temperature of the thus obtained pellets of the polymer compound (E)-3 was measured in the same manner as in Production Example 1. Further, the productivity (cutting property) and the storage stability of the antistatic agent were evaluated.

Production Example 4

In a separable flask, 58 g (0.65 mol) of 1,4-butanediol and 91 g (0.77 mol) of succinic acid were polymerized for 3 hours under normal pressure in the presence of 0.2 g of an antioxidant (tetrakis[3-(3,5-di-tert-butyl-4-hydroxyphenyl) propionyloxymethyl]methane: ADK STAB AO-60, manufactured by ADEKA Corporation) with the temperature being slowly increased from 140° C. to 190° C., whereby a polyester (a)-2 was obtained. This polyester (a)-2 had a number-average molecular weight of 1,000.

Next, 130 g of the thus obtained polyester (a)-2, 277 g of a polyethylene glycol having a number-average molecular weight of 3,300 and 75 ethyleneoxy group repeating units as a compound (b)-1 having hydroxy groups at both ends, 0.2 g of an antioxidant (ADK STAB AO-60), and 0.4 g of zirconium octylate were added and polymerized at 200° C. for 3 hours under reduced pressure to obtain 400 g of a block polymer (C)-2 having a structure containing carboxyl groups at both ends. This block polymer (C)-2 having a structure containing carboxyl groups at both ends had a number-average molecular weight (Mn) of 9,600.

To 400 g of the thus obtained block polymer (C)-2 having a structure containing carboxyl groups at both ends, 5 g of bisphenol F diglycidyl ether (epoxy equivalent: 170 g/eq) was added as the epoxy compound (D)-1 containing two or more epoxy groups, and these materials were polymerized at 220° C. for 5 hours under reduced pressure, after which a polymer compound (E)-4, which is the antistatic agent of the present invention, was obtained as 400 g of pellets in the same manner as in Production Example 1.

The crystallization temperature of the thus obtained pellets of the polymer compound (E)-4 was measured in the same manner as in Production Example 1. Further, the productivity (cutting property) and the storage stability of the antistatic agent were evaluated.

Production Example 5

In a separable flask, 100 g (1.61 mol) of ethylene glycol and 199 g (1.69 mol) of succinic acid were polymerized for 3 hours under normal pressure in the presence of 0.2 g of an antioxidant (tetrakis[3-(3,5-di-tert-butyl-4-hydroxyphenyl) propionyloxymethyl]methane: ADK STAB AO-60, manufactured by ADEKA Corporation) with the temperature being slowly increased from 140° C. to 190° C., whereby a polyester (a)-3 was obtained. This polyester (a)-3 had a number-average molecular weight of 3,000.

Next, 250 g of the thus obtained polyester (a)-3, 160 g of a polyethylene glycol having a number-average molecular weight of 3,300 and 75 ethyleneoxy group repeating units as a compound (b)-1 having hydroxy groups at both ends, 0.2 g of an antioxidant (ADK STAB AO-60), and 0.4 g of zirconium octylate were added and polymerized at 200° C. for 3 hours under reduced pressure to obtain 400 g of a block polymer (C)-3 having a structure containing carboxyl groups at both ends. This block polymer (C)-3 having a structure containing carboxyl groups at both ends had a number-average molecular weight (Mn) of 16,500.

To 400 g of the thus obtained block polymer (C)-3 having a structure containing carboxyl groups at both ends, 3 g of bisphenol F diglycidyl ether (epoxy equivalent: 170 g/eq) was added as the epoxy compound (D)-1 containing two or more epoxy groups, and these materials were polymerized at 220° C. for 5 hours under reduced pressure, after which a polymer compound (E)-5, which is the antistatic agent of the present invention, was obtained as 400 g of pellets in the same manner as in Production Example 1. The crystallization temperature of the thus obtained pellets of the polymer compound (E)-5 was measured in the same manner as in Production Example 1. Further, the productivity (cutting property) and the storage stability of the antistatic agent were evaluated.

Production Example 6

In a separable flask, 101 g (1.12 mol) of 1,4-butanediol, 17 g (0.28 mol) of ethylene glycol, and 173 g (1.47 mol) of succinic acid were polymerized for 3 hours under normal pressure in the presence of 0.2 g of an antioxidant (tetrakis [3-(3,5-di-tert-butyl-4-hydroxyphenyl)propionyloxymethyl] methane: ADK STAB AO-60, manufactured by ADEKA Corporation) with the temperature being slowly increased from 140° C. to 190° C., whereby a polyester (a)-4 was obtained. This polyester (a)-4 had a number-average molecular weight of 3,000.

Next, 243 g of the thus obtained polyester (a)-4, 161 g of a polyethylene glycol having a number-average molecular weight of 3,300 and 75 ethyleneoxy group repeating units as a compound (b)-1 having hydroxy groups at both ends, 0.2 g of an antioxidant (ADK STAB AO-60), and 0.4 g of zirconium octylate were added and polymerized at 200° C.

for 3 hours under reduced pressure to obtain 400 g of a block polymer (C)-4 having a structure containing carboxyl groups at both ends. This block polymer (C)-4 having a structure containing carboxyl groups at both ends had a number-average molecular weight (Mn) of 16,500.

To 400 g of the thus obtained block polymer (C)-4 having a structure containing carboxyl groups at both ends, 3 g of bisphenol F diglycidyl ether (epoxy equivalent: 170 g/eq) was added as the epoxy compound (D)-1 containing two or more epoxy groups, and these materials were polymerized at 220° C. for 5 hours under reduced pressure, after which a polymer compound (E)-6, which is the antistatic agent of the present invention, was obtained as 400 g of pellets in the same manner as in Production Example 1.

The crystallization temperature of the thus obtained pellets of the polymer compound (E)-6 was measured in the same manner as in Production Example 1. Further, the productivity (cutting property) and the storage stability of the antistatic agent were evaluated.

Production Example 7

In a separable flask, 120 g (1.33 mol) of 1,4-butanediol, 149 g (1.26 mol) of succinic acid, and 21 g (0.14 mol) of adipic acid were polymerized for 3 hours under normal pressure in the presence of 0.2 g of an antioxidant (tetrakis [3-(3,5-di-tert-butyl-4-hydroxyphenyl)propionyloxymethyl] methane: ADK STAB AO-60, manufactured by ADEKA Corporation) with the temperature being slowly increased from 140° C. to 190° C., whereby a polyester (a)-5 was obtained. This polyester (a)-5 had a number-average molecular weight of 3,000.

Next, 248 g of the thus obtained polyester (a)-5, 157 g of a polyethylene glycol having a number-average molecular weight of 3,300 and 75 ethyleneoxy group repeating units as a compound (b)-1 having hydroxy groups at both ends, 0.2 g of an antioxidant (ADK STAB AO-60), and 0.4 g of zirconium octylate were added and polymerized at 200° C. for 3 hours under reduced pressure to obtain 400 g of a block polymer (C)-5 having a structure containing carboxyl groups at both ends. This block polymer (C)-5 having a structure containing carboxyl groups at both ends had a number-average molecular weight (Mn) of 16,500.

To 400 g of the thus obtained block polymer (C)-5 having a structure containing carboxyl groups at both ends, 3 g of bisphenol F diglycidyl ether (epoxy equivalent: 170 g/eq) was added as the epoxy compound (D)-1 containing two or more epoxy groups, and these materials were polymerized at 220° C. for 5 hours under reduced pressure, after which a polymer compound (E)-7, which is the antistatic agent of the present invention, was obtained as 400 g of pellets in the same manner as in Production Example 1.

The crystallization temperature of the thus obtained pellets of the polymer compound (E)-7 was measured in the same manner as in Production Example 1. Further, the productivity (cutting property) and the storage stability of the antistatic agent were evaluated.

Production Example 8

In a separable flask, 118 g (1.31 mol) of 1,4-butanediol, 130 g (1.10 mol) of succinic acid, and 40 g (0.28 mol) of adipic acid were polymerized for 3 hours under normal pressure in the presence of 0.2 g of an antioxidant (tetrakis [3-(3,5-di-tert-butyl-4-hydroxyphenyl)propionyloxymethyl] methane: ADK STAB AO-60, manufactured by ADEKA Corporation) with the temperature being slowly increased from 140° C. to 190° C., whereby a polyester (a)-6 was obtained. This polyester (a)-6 had a number-average molecular weight of 3,000.

Next, 246 g of the thus obtained polyester (a)-6, 155 g of a polyethylene glycol having a number-average molecular weight of 3,300 and 75 ethyleneoxy group repeating units as a compound (b)-1 having hydroxy groups at both ends, 0.2 g of an antioxidant (ADK STAB AO-60), and 0.4 g of zirconium octylate were added and polymerized at 200° C. for 3 hours under reduced pressure to obtain 400 g of a block polymer (C)-6 having a structure containing carboxyl groups at both ends. This block polymer (C)-6 having a structure containing carboxyl groups at both ends had a number-average molecular weight (Mn) of 16,500.

To 400 g of the thus obtained block polymer (C)-6 having a structure containing carboxyl groups at both ends, 3 g of bisphenol F diglycidyl ether (epoxy equivalent: 170 g/eq) was added as the epoxy compound (D)-1 containing two or more epoxy groups, and these materials were polymerized at 220° C. for 5 hours under reduced pressure, after which a polymer compound (E)-8, which is the antistatic agent of the present invention, was obtained as 400 g of pellets in the same manner as in Production Example 1.

The crystallization temperature of the thus obtained pellets of the polymer compound (E)-8 was measured in the same manner as in Production Example 1. Further, the productivity (cutting property) and the storage stability of the antistatic agent were evaluated.

Production Example 9

In a separable flask, 116 g (1.28 mol) of 1,4-butanediol, 144 g (1.22 mol) of succinic acid, and 27 g (0.14 mol) of sebacic acid were polymerized for 3 hours under normal pressure in the presence of 0.2 g of an antioxidant (tetrakis [3-(3,5-di-tert-butyl-4-hydroxyphenyl)propionyloxymethyl] methane: ADK STAB AO-60, manufactured by ADEKA Corporation) with the temperature being slowly increased from 140° C. to 190° C., whereby a polyester (a)-7 was obtained. This polyester (a)-7 had a number-average molecular weight of 3,000.

Next, 251 g of the thus obtained polyester (a)-7, 154 g of a polyethylene glycol having a number-average molecular weight of 3,300 and 75 ethyleneoxy group repeating units as a compound (b)-1 having hydroxy groups at both ends, 0.2 g of an antioxidant (ADK STAB AO-60), and 0.4 g of zirconium octylate were added and polymerized at 200° C. for 3 hours under reduced pressure to obtain 400 g of a block polymer (C)-7 having a structure containing carboxyl groups at both ends. This block polymer (C)-7 having a structure containing carboxyl groups at both ends had a number-average molecular weight (Mn) of 16,500.

To 400 g of the thus obtained block polymer (C)-7 having a structure containing carboxyl groups at both ends, 3 g of bisphenol F diglycidyl ether (epoxy equivalent: 170 g/eq) was added as the epoxy compound (D)-1 containing two or more epoxy groups, and these materials were polymerized at 220° C. for 5 hours under reduced pressure, after which a polymer compound (E)-9, which is the antistatic agent of the present invention, was obtained as 400 g of pellets in the same manner as in Production Example 1.

The crystallization temperature of the thus obtained pellets of the polymer compound (E)-9 was measured in the same manner as in Production Example 1. Further, the productivity (cutting property) and the storage stability of the antistatic agent were evaluated.

Production Example 10

In a separable flask, 110 g (1.22 mol) of 1,4-butanediol, 122 g (1.04 mol) of succinic acid, and 52 g (0.26 mol) of sebacic acid were polymerized for 3 hours under normal pressure in the presence of 0.2 g of an antioxidant (tetrakis [3-(3,5-di-tert-butyl-4-hydroxyphenyl)propionyloxymethyl] methane: ADK STAB AO-60, manufactured by ADEKA Corporation) with the temperature being slowly increased from 140° C. to 190° C., whereby a polyester (a)-8 was obtained. This polyester (a)-8 had a number-average molecular weight of 3,000.

Next, 259 g of the thus obtained polyester (a)-8, 152 g of a polyethylene glycol having a number-average molecular weight of 3,300 and 75 ethyleneoxy group repeating units as a compound (b)-1 having hydroxy groups at both ends, 0.2 g of an antioxidant (ADK STAB AO-60), and 0.4 g of zirconium octylate were added and polymerized at 200° C. for 3 hours under reduced pressure to obtain 400 g of a block polymer (C)-8 having a structure containing carboxyl groups at both ends. This block polymer (C)-8 having a structure containing carboxyl groups at both ends had a number-average molecular weight (Mn) of 16,500.

To 400 g of the thus obtained block polymer (C)-8 having a structure containing carboxyl groups at both ends, 3 g of bisphenol F diglycidyl ether (epoxy equivalent: 170 g/eq) was added as the epoxy compound (D)-1 containing two or more epoxy groups, and these materials were polymerized at 220° C. for 5 hours under reduced pressure, after which a polymer compound (E)-10, which is the antistatic agent of the present invention, was obtained as 400 g of pellets in the same manner as in Production Example 1.

The crystallization temperature of the thus obtained pellets of the polymer compound (E)-10 was measured in the same manner as in Production Example 1. Further, the productivity (cutting property) and the storage stability of the antistatic agent were evaluated.

Production Example 11

In a separable flask, 105 g (1.17 mol) of 1,4-butanediol, 103 g (0.87 mol) of succinic acid, and 75 g (0.37 mol) of sebacic acid were polymerized for 3 hours under normal pressure in the presence of 0.2 g of an antioxidant (tetrakis [3-(3,5-di-tert-butyl-4-hydroxyphenyl)propionyloxymethyl] methane: ADK STAB AO-60, manufactured by ADEKA Corporation) with the temperature being slowly increased from 140° C. to 190° C., whereby a polyester (a)-9 was obtained. This polyester (a)-9 had a number-average molecular weight of 3,000.

Next, 250 g of the thus obtained polyester (a)-9, 161 g of a polyethylene glycol having a number-average molecular weight of 3,300 and 75 ethyleneoxy group repeating units as a compound (b)-1 having hydroxy groups at both ends, 0.2 g of an antioxidant (ADK STAB AO-60), and 0.4 g of zirconium octylate were added and polymerized at 200° C. for 3 hours under reduced pressure to obtain 400 g of a block polymer (C)-9 having a structure containing carboxyl groups at both ends. This block polymer (C)-9 having a structure containing carboxyl groups at both ends had a number-average molecular weight (Mn) of 16,500.

To 400 g of the thus obtained block polymer (C)-9 having a structure containing carboxyl groups at both ends, 3 g of bisphenol F diglycidyl ether (epoxy equivalent: 170 g/eq) was added as the epoxy compound (D)-1 containing two or more epoxy groups, and these materials were polymerized at 220° C. for 5 hours under reduced pressure, after which a polymer compound (E)-11, which is the antistatic agent of the present invention, was obtained as 400 g of pellets in the same manner as in Production Example 1.

The crystallization temperature of the thus obtained pellets of the polymer compound (E)-11 was measured in the same manner as in Production Example 1. Further, the productivity (cutting property) and the storage stability of the antistatic agent were evaluated.

Production Example 12

In a separable flask, 115 g (1.27 mol) of 1,4-butanediol, 143 g (1.21 mol) of succinic acid, and 29 g (0.13 mol) of 2,6-naphthalenedicarboxylic acid were polymerized for 3 hours under normal pressure in the presence of 0.2 g of an antioxidant (tetrakis[3-(3,5-di-tert-butyl-4-hydroxyphenyl) propionyloxymethyl]methane: ADK STAB AO-60, manufactured by ADEKA Corporation) with the temperature being slowly increased from 140° C. to 190° C., whereby a polyester (a)-10 was obtained. This polyester (a)-10 had a number-average molecular weight of 3,000.

Next, 256 g of the thus obtained polyester (a)-10, 170 g of a polyethylene glycol having a number-average molecular weight of 3,300 and 75 ethyleneoxy group repeating units as a compound (b)-1 having hydroxy groups at both ends, 0.2 g of an antioxidant (ADK STAB AO-60), and 0.4 g of zirconium octylate were added and polymerized at 200° C. for 3 hours under reduced pressure to obtain 400 g of a block polymer (C)-10 having a structure containing carboxyl groups at both ends. This block polymer (C)-10 having a structure containing carboxyl groups at both ends had a number-average molecular weight (Mn) of 16,500.

To 400 g of the thus obtained block polymer (C)-10 having a structure containing carboxyl groups at both ends, 3 g of bisphenol F diglycidyl ether (epoxy equivalent: 170 g/eq) was added as the epoxy compound (D)-1 containing two or more epoxy groups, and these materials were polymerized at 220° C. for 5 hours under reduced pressure, after which a polymer compound (E)-12, which is the antistatic agent of the present invention, was obtained as 400 g of pellets in the same manner as in Production Example 1.

The crystallization temperature of the thus obtained pellets of the polymer compound (E)-12 was measured in the same manner as in Production Example 1. Further, the productivity (cutting property) and the storage stability of the antistatic agent were evaluated.

Comparative Production Example 1

In a separable flask, 142 g (0.98 mol) of 1,4-cyclohexane dimethanol and 112 g (0.95 mol) of succinic acid were polymerized for 3 hours under normal pressure in the presence of 0.2 g of an antioxidant (tetrakis[3-(3,5-di-tert-butyl-4-hydroxyphenyl)propionyloxymethyl]methane: ADK STAB AO-60, manufactured by ADEKA Corporation) with the temperature being slowly increased from 140° C. to 190° C., whereby a comparative polyester-1 was obtained. This comparative polyester-1 had a number-average molecular weight of 3,000.

Next, 250 g of the thus obtained comparative polyester-1, 160 g of a polyethylene glycol having a number-average molecular weight of 3,300 and 75 ethyleneoxy group repeating units as a compound (b)-1 having hydroxy groups at both ends, 0.2 g of an antioxidant (ADK STAB AO-60), and 0.4 g of zirconium octylate were added and polymerized at 200° C. for 3 hours under reduced pressure to obtain 400 g of a comparative block polymer-1 having a structure containing carboxyl groups at both ends. This comparative block polymer-1 having a structure containing carboxyl groups at both ends had a number-average molecular weight (Mn) of 16,500.

To 400 g of the thus obtained comparative block polymer-1 having a structure containing carboxyl groups at both ends, 3 g of bisphenol F diglycidyl ether (epoxy equivalent: 170 g/eq) was added as the epoxy compound (D)-1 containing two or more epoxy groups, and these materials were polymerized at 220° C. for 5 hours under reduced pressure, after which a comparative antistatic agent-1 was obtained as 400 g of pellets in the same manner as in Production Example 1.

The crystallization temperature of the thus obtained pellets of the comparative antistatic agent-1 was measured in the same manner as in Production Example 1. Further, the productivity (cutting property) and the storage stability of the antistatic agent were evaluated.

Comparative Production Example 2

In a separable flask, 104 g (1.15 mol) of 1,4-butanediol and 179 g (1.22 mol) of adipic acid were polymerized for 3 hours under normal pressure in the presence of 0.2 g of an antioxidant (tetrakis[3-(3,5-di-tert-butyl-4-hydroxyphenyl) propionyloxymethyl]methane: ADK STAB AO-60, manufactured by ADEKA Corporation) with the temperature being slowly increased from 140° C. to 190° C., whereby a comparative polyester-2 was obtained. This comparative polyester-2 had a number-average molecular weight of 3,000.

Next, 250 g of the thus obtained comparative polyester-2, 160 g of a polyethylene glycol having a number-average molecular weight of 3,300 and 75 ethyleneoxy group repeating units as a compound (b)-1 having hydroxy groups at both ends, 0.2 g of an antioxidant (ADK STAB AO-60), and 0.4 g of zirconium octylate were added and polymerized at 200° C. for 3 hours under reduced pressure to obtain 400 g of a comparative block polymer-2 having a structure containing carboxyl groups at both ends. This comparative block polymer-2 having a structure containing carboxyl groups at both ends had a number-average molecular weight (Mn) of 16,500.

To 400 g of the thus obtained comparative block polymer-2 having a structure containing carboxyl groups at both ends, 3 g of bisphenol F diglycidyl ether (epoxy equivalent: 170 g/eq) was added as the epoxy compound (D)-1 containing two or more epoxy groups, and these materials were polymerized at 220° C. for 5 hours under reduced pressure, after which a comparative antistatic agent-2 was obtained as 400 g of pellets in the same manner as in Production Example 1.

The crystallization temperature of the thus obtained pellets of the comparative antistatic agent-2 was measured in the same manner as in Production Example 1. Further, the productivity (cutting property) and the storage stability of the antistatic agent were evaluated.

Examples 1 to 27 and Comparative Examples 1 to 5

Using the resin compositions of Examples and Comparative Examples which were blended based on the respective formulations (parts by mass) shown in Tables 1 to 5 below, test pieces were obtained in accordance with the below-described test piece preparation conditions. For the thus obtained test pieces, the surface resistivity (SR value) was measured and the antistaticity and its persistence were evaluated as described below. The results thereof are shown together in Tables 1 to 5.

<Conditions for Preparing Test Pieces of Homopolypropylene Resin Compositions>

Using a biaxial extruder manufactured by Ikegai Corp. (PCM30, equipped with a 60-mesh screen), resin compositions that were blended based on the respective formulations shown in Tables 1 to 5 below were each granulated under the conditions of 230° C. and 6 kg/hour to obtain pellets. Subsequently, using a horizontal injection molding machine (NEX80, manufactured by Nissei Plastic Industrial Co., Ltd.), the thus obtained pellets were molded at a resin temperature of 230° C. and a mold temperature of 40° C. to obtain a test piece (100 mm×100 mm×3 mm).

<Method for Measuring Surface Resistivity (SR Value)>

The thus obtained test piece was molded and, immediately thereafter, stored under the conditions of a temperature of 25° C. and a humidity of 50% RH. After 1 day and 30 days of storage, the surface resistivity (Ω/□) of the molded test piece was measured under the same atmosphere using an R8340 resistance meter manufactured by Advantest Corporation at an applied voltage of 100 V and a voltage application time of 1 minute. The measurement was performed at five spots per each of five test pieces, and an average value thereof was determined.

TABLE 1

| | | Example 1 | Example 2 | Example 3 | Example 4 | Example 5 | Example 6 | Example 7 |
|---|---|---|---|---|---|---|---|---|
| Antistatic agent | Polymer compound (E)-1 | 20 | 20 | 20 | — | — | — | — |
| | Polymer compound (E)-2 | — | — | — | 20 | 20 | — | — |
| | Polymer compound (E)-3 | — | — | — | — | — | 20 | 20 |
| | Polymer compound (E)-4 | — | — | — | — | — | — | — |
| | Polymer compound (E)-5 | — | — | — | — | — | — | — |
| | Polymer compound (E)-6 | — | — | — | — | — | — | — |
| | Polymer compound (E)-7 | — | — | — | — | — | — | — |
| | Polymer compound (E)-8 | — | — | — | — | — | — | — |

TABLE 1-continued

| | | Example 1 | Example 2 | Example 3 | Example 4 | Example 5 | Example 6 | Example 7 |
|---|---|---|---|---|---|---|---|---|
| | Polymer compound (E)-9 | — | — | — | — | — | — | — |
| | Polymer compound (E)-10 | — | — | — | — | — | — | — |
| | Polymer compound (E)-11 | — | — | — | — | — | — | — |
| | Polymer compound (E)-12 | — | — | — | — | — | — | — |
| | Comparative antistatic agent-1 | — | — | — | — | — | — | — |
| | Comparative antistatic agent-2 | — | — | — | — | — | — | — |
| Alkali metal salt | NaDBS*[1] | — | 2.0 | — | — | 2.0 | — | 2.0 |
| Ionic liquid | C2minDBS*[2] | — | — | 2.0 | — | — | — | — |
| Thermoplastic resin | hPP*[3] | 80 | 80 | 80 | 80 | 80 | 80 | 80 |
| Crystallization temperature (° C.) | | 63 | 63 | 63 | 62 | 62 | 63 | 63 |
| Cutting property (%) | | 97 | 97 | 97 | 97 | 97 | 97 | 97 |
| Storage stability of antistatic agent | | ○ | ○ | ○ | ○ | ○ | ○ | ○ |
| Surface resistivity (Ω/□) | after 1 day | 1.8 × $10^{11}$ | 2.2 × $10^{9}$ | 8.1 × $10^{8}$ | 2.3 × $10^{11}$ | 5.0 × $10^{9}$ | 4.7 × $10^{11}$ | 7.0 × $10^{9}$ |
| | after 30 days | 1.8 × $10^{11}$ | 2.2 × $10^{9}$ | 8.1 × $10^{8}$ | 2.4 × $10^{11}$ | 5.0 × $10^{9}$ | 4.7 × $10^{11}$ | 7.2 × $10^{9}$ |

*[1]sodium dodecylbenzenesulfonate

*[2]1-ethyl-3-methylimidazolium dodecylbenzenesulfonate

*[3]homopolypropylene (melt flow rate (ISO1133, 230° C. × 2.16 kg) = 8 g/10 min))

TABLE 2

| | | Example 8 | Example 9 | Example 10 | Example 11 | Example 12 | Example 13 | Example 14 |
|---|---|---|---|---|---|---|---|---|
| Antistatic agent | Polymer compound (E)-1 | 15 | 25 | — | — | — | — | — |
| | Polymer compound (E)-2 | — | — | — | — | — | — | — |
| | Polymer compound (E)-3 | — | — | — | — | — | — | — |
| | Polymer compound (E)-4 | — | — | 20 | 20 | — | — | — |
| | Polymer compound (E)-5 | — | — | — | — | 20 | 20 | — |
| | Polymer compound (E)-6 | — | — | — | — | — | — | 20 |
| | Polymer compound (E)-7 | — | — | — | — | — | — | — |
| | Polymer compound (E)-8 | — | — | — | — | — | — | — |
| | Polymer compound (E)-9 | — | — | — | — | — | — | — |
| | Polymer compound (E)-10 | — | — | — | — | — | — | — |
| | Polymer compound (E)-11 | — | — | — | — | — | — | — |
| | Polymer compound (E)-12 | — | — | — | — | — | — | — |
| | Comparative antistatic agent-1 | — | — | — | — | — | — | — |
| | Comparative antistatic agent-2 | — | — | — | — | — | — | — |
| Alkali metal salt | NaDBS*[1] | 1.5 | 2.5 | — | 2.0 | — | 2.0 | — |
| Ionic liquid | C2minDBS*[2] | — | — | — | — | — | — | — |
| Thermoplastic resin | hPP*[3] | 80 | 80 | 80 | 80 | 80 | 80 | 80 |
| Crystallization temperature (° C.) | | 63 | 63 | 54 | 54 | 50 | 50 | 54 |
| Cutting property (%) | | 97 | 97 | 88 | 88 | 85 | 85 | 90 |
| Storage stability of antistatic agent | | ○ | ○ | Δ | Δ | Δ | Δ | Δ |
| Surface resistivity (Ω/□) | after 1 day | 2.8 × $10^{9}$ | 1.8 × $10^{9}$ | 1.9 × $10^{11}$ | 2.4 × $10^{9}$ | 2.0 × $10^{11}$ | 2.5 × $10^{9}$ | 2.0 × $10^{11}$ |
| | after 30 days | 2.9 × $10^{9}$ | 2.0 × $10^{9}$ | 2.0 × $10^{11}$ | 2.5 × $10^{9}$ | 2.1 × $10^{11}$ | 2.7 × $10^{9}$ | 2.0 × $10^{11}$ |

TABLE 3

| | | Example 15 | Example 16 | Example 17 | Example 18 | Example 19 | Example 20 | Example 21 |
|---|---|---|---|---|---|---|---|---|
| Antistatic agent | Polymer compound (E)-1 | — | — | — | — | — | — | — |
| | Polymer compound (E)-2 | — | — | — | — | — | — | — |
| | Polymer compound (E)-3 | — | — | — | — | — | — | — |
| | Polymer compound (E)-4 | — | — | — | — | — | — | — |
| | Polymer compound (E)-5 | — | — | — | — | — | — | — |
| | Polymer compound (E)-6 | 20 | — | — | — | — | — | — |
| | Polymer compound (E)-7 | — | 20 | 20 | — | — | — | — |
| | Polymer compound (E)-8 | — | — | — | 20 | 20 | — | — |
| | Polymer compound (E)-9 | — | — | — | — | — | 20 | 20 |
| | Polymer compound (E)-10 | — | — | — | — | — | — | — |
| | Polymer compound (E)-11 | — | — | — | — | — | — | — |
| | Polymer compound (E)-12 | — | — | — | — | — | — | — |
| | Comparative antistatic agent-1 | — | — | — | — | — | — | — |
| | Comparative antistatic agent-2 | — | — | — | — | — | — | — |
| Alkali metal salt | NaDBS*[1] | 2.0 | — | 2.0 | — | 2.0 | — | 2.0 |
| Ionic liquid | C2minDBS*[2] | — | — | — | — | — | — | — |
| Thermoplastic resin | hPP*[3] | 80 | 80 | 80 | 80 | 80 | 80 | 80 |
| Crystallization temperature (° C.) | | 54 | 56 | 56 | 50 | 50 | 52 | 52 |
| Cutting property (%) | | 90 | 90 | 90 | 82 | 82 | 84 | 84 |
| Storage stability of antistatic agent | | Δ | ○ | ○ | ○ | ○ | ○ | ○ |
| Surface resistivity (Ω/□) | after 1 day | $1.9 \times 10^{9}$ | $3.1 \times 10^{11}$ | $4.2 \times 10^{9}$ | $4.9 \times 10^{11}$ | $6.1 \times 10^{9}$ | $5.0 \times 10^{11}$ | $6.9 \times 10^{9}$ |
| | after 30 days | $1.9 \times 10^{9}$ | $3.1 \times 10^{11}$ | $4.2 \times 10^{9}$ | $5.0 \times 10^{11}$ | $6.1 \times 10^{9}$ | $5.0 \times 10^{11}$ | $6.8 \times 10^{9}$ |

TABLE 4

| | | Example 22 | Example 23 | Example 24 | Example 25 | Example 26 | Example 27 |
|---|---|---|---|---|---|---|---|
| Antistatic agent | Polymer compound (E)-1 | — | — | — | — | — | — |
| | Polymer compound (E)-2 | — | — | — | — | — | — |
| | Polymer compound (E)-3 | — | — | — | — | — | — |
| | Polymer compound (E)-4 | — | — | — | — | — | — |
| | Polymer compound (E)-5 | — | — | — | — | — | — |
| | Polymer compound (E)-6 | — | — | — | — | — | — |
| | Polymer compound (E)-7 | — | — | — | — | — | — |
| | Polymer compound (E)-8 | — | — | — | — | — | — |
| | Polymer compound (E)-9 | — | — | — | — | — | — |
| | Polymer compound (E)-10 | 20 | 20 | — | — | — | — |
| | Polymer compound (E)-11 | — | — | 20 | 20 | — | — |
| | Polymer compound (E)-12 | — | — | — | — | 20 | 20 |
| | Comparative antistatic agent-1 | — | — | — | — | — | — |
| | Comparative antistatic agent-2 | — | — | — | — | — | — |

TABLE 4-continued

| | | Example 22 | Example 23 | Example 24 | Example 25 | Example 26 | Example 27 |
|---|---|---|---|---|---|---|---|
| Alkali metal salt | NaDBS*1 | — | 2.0 | — | 2.0 | — | 2.0 |
| Ionic liquid | C2minDBS*2 | — | — | — | — | — | — |
| Thermoplastic resin | hPP*3 | 80 | 80 | 80 | 80 | 80 | 80 |
| Crystallization temperature (° C.) | | 32 | 32 | 18 | 18 | 75 | 75 |
| Cutting property (%) | | 73 | 73 | 63 | 63 | 56 | 56 |
| Storage stability of antistatic agent | | Δ | Δ | Δ | Δ | ○ | ○ |
| Surface resistivity (Ω/□) | after 1 day | 7.2 × $10^{11}$ | 7.9 × $10^{9}$ | 7.7 × $10^{11}$ | 7.9 × $10^{9}$ | 4.8 × $10^{11}$ | 5.7 × $10^{9}$ |
| | after 30 days | 7.1 × $10^{11}$ | 7.6 × $10^{9}$ | 7.5 × $10^{11}$ | 8.0 × $10^{9}$ | 4.7 × $10^{11}$ | 5.5 × $10^{9}$ |

TABLE 5

| | | Comparative Example 1 | Comparative Example 2 | Comparative Example 3 | Comparative Example 4 | Comparative Example 5 |
|---|---|---|---|---|---|---|
| Antistatic agent | Polymer compound (E)-1 | — | — | — | — | — |
| | Polymer compound (E)-2 | — | — | — | — | — |
| | Polymer compound (E)-3 | — | — | — | — | — |
| | Polymer compound (E)-4 | — | — | — | — | — |
| | Polymer compound (E)-5 | — | — | — | — | — |
| | Polymer compound (E)-6 | — | — | — | — | — |
| | Polymer compound (E)-7 | — | — | — | — | — |
| | Polymer compound (E)-8 | — | — | — | — | — |
| | Polymer compound (E)-9 | — | — | — | — | — |
| | Polymer compound (E)-10 | — | — | — | — | — |
| | Polymer compound (E)-11 | — | — | — | — | — |
| | Polymer compound (E)-12 | — | — | — | — | — |
| | Comparative antistatic agent-1 | — | 20 | 20 | — | — |
| | Comparative antistatic agent-2 | — | — | — | 20 | 20 |
| Alkali metal salt | NaDBS*1 | — | — | 2.0 | — | 2.0 |
| Ionic liquid | C2minDBS*2 | — | — | — | — | — |
| Thermoplastic resin | hPP*3 | 80 | 80 | 80 | 80 | 80 |
| Crystallization temperature (° C.) | | — | 24 | 24 | 18 | 18 |
| Cutting property (%) | | — | 48 | 48 | 35 | 35 |
| Storage stability of antistatic agent | | — | x | x | x | x |
| Surface resistivity (Ω/□) | after 1 day | 4.3 × $10^{16}$ | 4.5 × $10^{11}$ | 6.1 × $10^{9}$ | 5.0 × $10^{11}$ | 6.8 × $10^{9}$ |
| | after 30 days | 4.3 × $10^{16}$ | 4.5 × $10^{11}$ | 6.2 × $10^{9}$ | 5.2 × $10^{11}$ | 6.9 × $10^{9}$ |

It is apparent from the results shown in Tables 1 to 5 that, according to the present invention, an antistatic agent which exhibits an excellent antistatic effect with excellent persistence and has excellent storage stability and productivity (cutting property) can be obtained.

Examples 28 to 49 and Comparative Examples 6 to 54

Using the resin compositions of Examples and Comparative Examples which were blended based on the respective formulations (parts by mass) shown in Tables 6 to 15 below, test pieces were obtained in accordance with the below-described test piece preparation conditions. For the thus obtained test pieces, the surface resistivity (SR value) was measured and the antistaticity and its persistence were evaluated in accordance with the above-described conditions. In addition, the crystallization temperature, the cutting property, and the storage stability of each antistatic agent were evaluated in accordance with the above-described conditions. The results thereof are shown together in Tables 6 to 15.

<Conditions for Preparing Test Pieces of Impact Copolymer Polypropylene (ICP) Resin Compositions>

Using a biaxial extruder manufactured by Ikegai Corp. (PCM30, equipped with a 60-mesh screen), impact copolymer polypropylene resin compositions that were blended based on the respective formulations shown in Tables 6 to 15 below were each granulated under the conditions of 230° C. and 6 kg/hour to obtain pellets. Subsequently, using a horizontal injection molding machine (NEX80, manufactured by Nissei Plastic Industrial Co., Ltd.), the thus obtained pellets were molded at a resin temperature of 230° C. and a mold temperature of 40° C. to obtain a test piece (100 mm×100 mm×3 mm). As an impact copolymer polypropylene, one having a melt flow rate of 14 g/10 min (ISO1133, 230° C.×2.16 kg) was used.

<Conditions for Preparing Test Pieces of High-Density Polyethylene (HDPE) Resin Compositions>

Using a biaxial extruder manufactured by Ikegai Corp. (PCM30, equipped with a 60-mesh screen), high-density polyethylene resin compositions that were blended based on the respective formulations shown in Tables 6 to 15 below were each granulated under the conditions of 200° C. and 6 kg/hour to obtain pellets. Subsequently, using a horizontal injection molding machine (NEX80, manufactured by Nissei Plastic Industrial Co., Ltd.), the thus obtained pellets were molded at a resin temperature of 200° C. and a mold temperature of 40° C. to obtain a test piece (100 mm×100 mm×3 mm). As a high-density polyethylene, one having a melt flow rate of 8 g/10 min (ISO1133, 190° C.×2.16 kg) was used.

<Conditions for Preparing Test Pieces of Polybutylene Terephthalate (PBT) Resin Compositions>

Using a biaxial extruder manufactured by Ikegai Corp. (PCM30, equipped with a 60-mesh screen), high-density polyethylene resin compositions that were blended based on the respective formulations shown in Tables 6 to 15 below were each granulated under the conditions of 260° C. and 6 kg/hour to obtain pellets. Subsequently, using a horizontal injection molding machine (NEX80, manufactured by Nissei Plastic Industrial Co., Ltd.), the thus obtained pellets were molded at a resin temperature of 260° C. and a mold temperature of 60° C. to obtain a test piece (100 mm×100 mm×3 mm). As a polybutylene terephthalate, one having an intrinsic viscosity of 1.3 (ISO1628-1) was used.

<Conditions for Preparing Test Pieces of ABS Resin Compositions>

Using a biaxial extruder manufactured by Ikegai Corp. (PCM30, equipped with a 60-mesh screen), ABS resin compositions were each granulated based on the respective formulations shown in Tables 6 to 15 below under the conditions of 230° C. and 6 kg/hour to obtain pellets. Subsequently, using a horizontal injection molding machine (NEX80, manufactured by Nissei Plastic Industrial Co., Ltd.), the thus obtained pellets were molded at a resin temperature of 230° C. and a mold temperature of 50° C. to obtain a test piece (100 mm×100 mm×3 mm). As an ABS resin, one having a melt flow rate of 17 g/10 min (ISO1133, 220° C.×10.00 kg) was used.

<Conditions for Preparing Test Pieces of Polycarbonate/ABS Resin Compositions>

Using a biaxial extruder manufactured by Ikegai Corp. (PCM30, equipped with a 60-mesh screen), polycarbonate/ABS resin compositions were each granulated based on the respective formulations shown in Tables 6 to 15 below under the conditions of 250° C. and 6 kg/hour to obtain pellets. Subsequently, using a horizontal injection molding machine (NEX80, manufactured by Nissei Plastic Industrial Co., Ltd.), the thus obtained pellets were molded at a resin temperature of 250° C. and a mold temperature of 50° C. to obtain a test piece (100 mm×100 mm×3 mm). As a polycarbonate/ABS resin, one having a polycarbonate/ABS ratio of 7/3 (mass ratio) and a melt flow rate of 40 g/10 min (ISO1133, 260° C.×5.00 kg) was used.

<Conditions for Preparing Test Pieces of High-Impact Polystyrene (HIPS) Resin Compositions>

Using a biaxial extruder manufactured by Ikegai Corp. (PCM30, equipped with a 60-mesh screen), high-impact polystyrene resin compositions were each granulated based on the respective formulations shown in Tables 6 to 15 below under the conditions of 230° C. and 6 kg/hour to obtain pellets. Subsequently, using a horizontal injection molding machine (NEX80, manufactured by Nissei Plastic Industrial Co., Ltd.), the thus obtained pellets were molded at a resin temperature of 230° C. and a mold temperature of 50° C. to obtain a test piece (100 mm×100 mm×3 mm). As a high-impact polystyrene, one having a melt flow rate of 3 g/10 min (ISO1133, 200° C.×5.00 kg) was used.

<Conditions for Preparing Test Pieces of Polycarbonate (PC) Resin Compositions>

Using a biaxial extruder manufactured by Ikegai Corp. (PCM30, equipped with a 60-mesh screen), polycarbonate resin compositions were each granulated based on the respective formulations shown in Tables 6 to 15 below under the conditions of 280° C. and 6 kg/hour to obtain pellets. Subsequently, using a horizontal injection molding machine (NEX80, manufactured by Nissei Plastic Industrial Co., Ltd.), the thus obtained pellets were molded at a resin temperature of 280° C. and a mold temperature of 80° C. to obtain a test piece (100 mm×100 mm×3 mm). As a polycarbonate, one having a melt flow rate of 15 g/10 min (ISO1133, 300° C.×1.20 kg) was used.

<Conditions for Preparing Test Pieces of Polyamide 6 (PA6) Resin Compositions>

Using a biaxial extruder manufactured by Ikegai Corp. (PCM30, equipped with a 60-mesh screen), polyamide 6 resin compositions were each granulated based on the respective formulations shown in Tables 6 to 15 below under the conditions of 260° C. and 6 kg/hour to obtain pellets. Subsequently, using a horizontal injection molding machine (NEX80, manufactured by Nissei Plastic Industrial Co., Ltd.), the thus obtained pellets were molded at a resin temperature of 260° C. and a mold temperature of 80° C. to obtain a test piece (100 mm×100 mm×3 mm). As a polyamide 6, AMILAN CM1017 (manufactured by Toray Industries, Inc.) was used.

<Conditions for Preparing Test Pieces of Polylactic Acid (PLA) Resin Compositions>

Using a biaxial extruder manufactured by Ikegai Corp. (PCM30, equipped with a 60-mesh screen), polylactic acid resin compositions were each granulated based on the respective formulations shown in Tables 6 to 15 below under the conditions of 210° C. and 6 kg/hour to obtain pellets. Subsequently, using a horizontal injection molding machine (NEX80, manufactured by Nissei Plastic Industrial Co., Ltd.), the thus obtained pellets were molded at a resin temperature of 210° C. and a mold temperature of 25° C. to obtain a test piece (100 mm×100 mm×3 mm). As a polylactic acid, one having a melt flow rate of 7 g/10 min (ISO1133, 210° C.×2.16 kg) was used.

<Conditions for Preparing Test Pieces of Polybutylene Terephthalate/ABS (PBT/ABS) Resin Compositions>

Using a biaxial extruder manufactured by Ikegai Corp. (PCM30, equipped with a 60-mesh screen), polybutylene terephthalate/ABS resin compositions were each granulated based on the respective formulations shown in Tables 6 to 15 below under the conditions of 250° C. and 6 kg/hour to obtain pellets. Subsequently, using a horizontal injection molding machine (NEX80, manufactured by Nissei Plastic Industrial Co., Ltd.), the thus obtained pellets were molded at a resin temperature of 250° C. and a mold temperature of 70° C. to obtain a test piece (100 mm×100 mm×3 mm). As a polybutylene terephthalate/ABS, one having a melt flow rate of 30 g/10 min (ISO1133, 240° C.×10.00 kg) was used.

<Conditions for Preparing Test Pieces of Polycarbonate/Polybutylene Terephthalate (PC/PBT) Resin Compositions>

Using a biaxial extruder manufactured by Ikegai Corp. (PCM30, equipped with a 60-mesh screen), polycarbonate/polybutylene terephthalate resin compositions were each granulated based on the respective formulations shown in Tables 6 to 15 below under the conditions of 270° C. and 6 kg/hour to obtain pellets. Subsequently, using a horizontal injection molding machine (NEX80, manufactured by Nissei Plastic Industrial Co., Ltd.), the thus obtained pellets were molded at a resin temperature of 270° C. and a mold temperature of 80° C. to obtain a test piece (100 mm×100 mm×3 mm). As a polycarbonate/polybutylene terephthalate, one having a melt flow rate of 7 g/10 min (ISO1133, 300° C.×1.20 kg) was used.

TABLE 6

| | | Example 28 | Example 29 | Example 30 | Example 31 | Example 32 | Example 33 | Example 34 |
|---|---|---|---|---|---|---|---|---|
| Antistatic agent | Polymer compound (E)-1 | 10 | 20 | 10 | 20 | 10 | 20 | 10 |
| | Comparative antistatic agent-1 | — | — | — | — | — | — | — |
| | Comparative antistatic agent-2 | — | — | — | — | — | — | — |
| Alkali metal salt | NaDBS*[1] | 1.0 | 2.0 | 1.0 | 2.0 | 1.0 | 2.0 | 1.0 |
| Ionic liquid | BMIM-DBS*[4] | — | — | — | — | — | — | — |
| Thermoplastic resin | ICP | 90 | 80 | — | — | — | — | — |
| | HDPE | — | — | 90 | 80 | — | — | — |
| | PBT | — | — | — | — | 90 | 80 | — |
| | ABS | — | — | — | — | — | — | 90 |
| | PC/ABS | — | — | — | — | — | — | — |
| | HIPS | — | — | — | — | — | — | — |
| | PC | — | — | — | — | — | — | — |
| | PA6 | — | — | — | — | — | — | — |
| | PLA | — | — | — | — | — | — | — |
| | PBT/ABS | — | — | — | — | — | — | — |
| | PC/PBT | — | — | — | — | — | — | — |
| Crystallization temperature (° C.) | | 63 | 63 | 63 | 63 | 63 | 63 | 63 |
| Cutting property (%) | | 97 | 97 | 97 | 97 | 97 | 97 | 97 |
| Storage stability of antistatic agent | | ○ | ○ | ○ | ○ | ○ | ○ | ○ |
| Surface resistivity (Ω/□) | after 1 day | $1.8 \times 10^{12}$ | $2.7 \times 10^{9}$ | $4.0 \times 10^{10}$ | $3.0 \times 10^{9}$ | $7.4 \times 10^{11}$ | $4.0 \times 10^{9}$ | $5.2 \times 10^{10}$ |
| | after 30 days | $1.9 \times 10^{12}$ | $2.7 \times 10^{9}$ | $4.0 \times 10^{10}$ | $3.0 \times 10^{9}$ | $7.6 \times 10^{11}$ | $4.1 \times 10^{9}$ | $5.2 \times 10^{10}$ |

*[4]1-butyl-3-methylimidazolium dodecylbenzenesulfonate

TABLE 7

| | | Example 35 | Example 36 | Example 37 | Example 38 | Example 39 | Example 40 | Example 41 |
|---|---|---|---|---|---|---|---|---|
| Antistatic agent | Polymer compound (E)-1 | 20 | 10 | 20 | 10 | 20 | 20 | 20 |
| | Comparative antistatic agent-1 | — | — | — | — | — | — | — |
| | Comparative antistatic agent-2 | — | — | — | — | — | — | — |
| Alkali metal salt | NaDBS*[1] | 2.0 | 1.0 | 2.0 | 1.0 | 2.0 | 2.0 | 2.0 |
| Ionic liquid | BMIM-DBS*[4] | — | — | — | — | — | — | — |
| Thermoplastic resin | ICP | — | — | — | — | — | — | — |
| | HDPE | — | — | — | — | — | — | — |
| | PBT | — | — | — | — | — | — | — |
| | ABS | 80 | — | — | — | — | — | — |
| | PC/ABS | — | 90 | 80 | — | — | — | — |
| | HIPS | — | — | — | 90 | 80 | — | — |
| | PC | — | — | — | — | — | 80 | — |
| | PA6 | — | — | — | — | — | — | 80 |
| | PLA | — | — | — | — | — | — | — |
| | PBT/ABS | — | — | — | — | — | — | — |
| | PC/PBT | — | — | — | — | — | — | — |
| Crystallization temperature (° C.) | | 63 | 63 | 63 | 63 | 63 | 63 | 63 |
| Cutting property (%) | | 97 | 97 | 97 | 97 | 97 | 97 | 97 |
| Storage stability of antistatic agent | | ○ | ○ | ○ | ○ | ○ | ○ | ○ |
| Surface resistivity (Ω/□) | after 1 day | $7.5 \times 10^{8}$ | $9.1 \times 10^{10}$ | $1.2 \times 10^{9}$ | $7.0 \times 10^{9}$ | $7.2 \times 10^{8}$ | $2.8 \times 10^{11}$ | $3.0 \times 10^{11}$ |
| | after 30 days | $7.4 \times 10^{8}$ | $8.9 \times 10^{10}$ | $1.2 \times 10^{9}$ | $7.0 \times 10^{9}$ | $7.2 \times 10^{8}$ | $3.0 \times 10^{11}$ | $3.0 \times 10^{11}$ |

TABLE 8

| | | Example 42 | Example 43 | Example 44 | Example 46 | Example 47 | Example 48 | Example 49 |
|---|---|---|---|---|---|---|---|---|
| Antistatic agent | Polymer compound (E)-1 | 20 | 10 | 20 | 10 | 20 | 20 | 20 |
| | Comparative antistatic agent-1 | — | — | — | — | — | — | — |
| | Comparative antistatic agent-2 | — | — | — | — | — | — | — |
| Alkali metal salt | NaDBS*[1] | 2.0 | 1.0 | 2.0 | 1.0 | 2.0 | — | — |
| Ionic liquid | BMIM-DBS*[4] | — | — | — | — | — | 2.0 | 2.0 |
| Thermoplastic resin | ICP | — | — | — | — | — | 80 | — |
| | HDPE | — | — | — | — | — | — | — |
| | PBT | — | — | — | — | — | — | — |
| | ABS | — | — | — | — | — | — | 80 |
| | PC/ABS | — | — | — | — | — | — | — |
| | HIPS | — | — | — | — | — | — | — |
| | PC | — | — | — | — | — | — | — |
| | PA6 | — | — | — | — | — | — | — |
| | PLA | 80 | — | — | — | — | — | — |
| | PBT/ABS | — | 90 | 80 | — | — | — | — |
| | PC/PBT | — | — | — | 90 | 80 | — | — |
| Crystallization temperature (° C.) | | 63 | 63 | 63 | 63 | 63 | 63 | 63 |
| Cutting property (%) | | 97 | 97 | 97 | 97 | 97 | 97 | 97 |
| Storage stability of antistatic agent | | ○ | ○ | ○ | ○ | ○ | ○ | ○ |
| Surface resistivity (Ω/□) | after 1 day | $1.8 \times 10^{12}$ | $3.7 \times 10^{12}$ | $4.3 \times 10^{9}$ | $1.8 \times 10^{12}$ | $6.8 \times 10^{9}$ | $7.3 \times 10^{8}$ | $3.2 \times 10^{8}$ |
| | after 30 days | $2.0 \times 10^{12}$ | $3.5 \times 10^{12}$ | $4.2 \times 10^{9}$ | $1.4 \times 10^{12}$ | $6.6 \times 10^{9}$ | $7.1 \times 10^{8}$ | $3.0 \times 10^{8}$ |

TABLE 9

| | | Comparative Example 6 | Comparative Example 7 | Comparative Example 8 | Comparative Example 9 | Comparative Example 10 | Comparative Example 11 | Comparative Example 12 |
|---|---|---|---|---|---|---|---|---|
| Antistatic agent | Polymer compound (E)-1 | — | — | — | — | — | — | — |
| | Comparative antistatic agent-1 | — | 10 | 20 | — | — | — | 10 |
| | Comparative antistatic agent-2 | — | — | — | 10 | 20 | — | — |
| Alkali metal salt | NaDBS*[1] | — | 1.0 | 2.0 | 1.0 | 2.0 | — | 1.0 |
| Ionic liquid | BMIM-DBS*[4] | — | — | — | — | — | — | — |
| Thermoplastic resin | ICP | 100 | 90 | 80 | 90 | 80 | — | — |
| | HDPE | — | — | — | — | — | 100 | 90 |
| | PBT | — | — | — | — | — | — | — |
| | ABS | — | — | — | — | — | — | — |
| | PC/ABS | — | — | — | — | — | — | — |
| | HIPS | — | — | — | — | — | — | — |
| | PC | — | — | — | — | — | — | — |
| | PA6 | — | — | — | — | — | — | — |
| | PLA | — | — | — | — | — | — | — |
| | PBT/ABS | — | — | — | — | — | — | — |
| | PC/PBT | — | — | — | — | — | — | — |
| Crystallization temperature (° C.) | | — | 24 | 24 | 18 | 18 | — | 24 |
| Cutting property (%) | | — | 48 | 48 | 35 | 35 | — | 48 |
| Storage stability of antistatic agent | | — | x | x | x | x | — | x |
| Surface resistivity (Ω/□) | after 1 day | $1.0 \times 10^{16}$ | $5.0 \times 10^{12}$ | $7.5 \times 10^{9}$ | $5.5 \times 10^{12}$ | $8.3 \times 10^{9}$ | $1.0 \times 10^{16}$ | $1.1 \times 10^{11}$ |
| | after 30 days | $1.0 \times 10^{16}$ | $5.2 \times 10^{12}$ | $7.5 \times 10^{9}$ | $5.5 \times 10^{12}$ | $8.2 \times 10^{9}$ | $1.0 \times 10^{16}$ | $1.0 \times 10^{11}$ |

TABLE 10

| | | Comparative Example 13 | Comparative Example 14 | Comparative Example 15 | Comparative Example 16 | Comparative Example 17 | Comparative Example 18 | Comparative Example 19 |
|---|---|---|---|---|---|---|---|---|
| Antistatic agent | Polymer compound (E)-1 | — | — | — | — | — | — | — |
| | Comparative antistatic agent-1 | 20 | — | — | — | 10 | 20 | — |
| | Comparative antistatic agent-2 | — | 10 | 20 | — | — | — | 10 |

TABLE 10-continued

| | | Comparative Example 13 | Comparative Example 14 | Comparative Example 15 | Comparative Example 16 | Comparative Example 17 | Comparative Example 18 | Comparative Example 19 |
|---|---|---|---|---|---|---|---|---|
| Alkali metal salt | NaDBS*1 | 2.0 | 1.0 | 2.0 | — | 1.0 | 2.0 | 1.0 |
| Ionic liquid | BMIM-DBS*4 | — | — | — | — | — | — | — |
| Thermoplastic resin | ICP | — | — | — | — | — | — | — |
| | HDPE | 80 | 90 | 80 | — | — | — | — |
| | PBT | — | — | — | 100 | 90 | 80 | 90 |
| | ABS | — | — | — | — | — | — | — |
| | PC/ABS | — | — | — | — | — | — | — |
| | HIPS | — | — | — | — | — | — | — |
| | PC | — | — | — | — | — | — | — |
| | PA6 | — | — | — | — | — | — | — |
| | PLA | — | — | — | — | — | — | — |
| | PBT/ABS | — | — | — | — | — | — | — |
| | PC/PBT | — | — | — | — | — | — | — |
| Crystallization temperature (° C.) | | 24 | 18 | 18 | — | 24 | 24 | 18 |
| Cutting property (%) | | 48 | 35 | 35 | — | 48 | 48 | 35 |
| Storage stability of antistatic agent | | x | x | x | — | x | x | x |
| Surface resistivity (Ω/□) | after 1 day | $8.4 \times 10^{9}$ | $1.2 \times 10^{11}$ | $9.2 \times 10^{9}$ | $1.0 \times 10^{16}$ | $2.1 \times 10^{12}$ | $1.1 \times 10^{10}$ | $2.4 \times 10^{12}$ |
| | after 30 days | $8.5 \times 10^{9}$ | $1.3 \times 10^{11}$ | $9.2 \times 10^{9}$ | $1.0 \times 10^{16}$ | $2.0 \times 10^{12}$ | $1.1 \times 10^{10}$ | $2.3 \times 10^{12}$ |

TABLE 11

| | | Comparative Example 20 | Comparative Example 21 | Comparative Example 22 | Comparative Example 23 | Comparative Example 24 | Comparative Example 25 | Comparative Example 26 |
|---|---|---|---|---|---|---|---|---|
| Antistatic agent | Polymer compound (E)-1 | — | — | — | — | — | — | — |
| | Comparative antistatic agent-1 | — | — | 10 | 20 | — | — | — |
| | Comparative antistatic agent-2 | 20 | — | — | — | 10 | 20 | — |
| Alkali metal salt | NaDBS*1 | 2.0 | — | 1.0 | 2.0 | 1.0 | 2.0 | — |
| Ionic liquid | BMIM-DBS*4 | — | — | — | — | — | — | — |
| Thermoplastic resin | ICP | — | — | — | — | — | — | — |
| | HDPE | — | — | — | — | — | — | — |
| | PBT | 80 | — | — | — | — | — | — |
| | ABS | — | 100 | 90 | 80 | 90 | 80 | — |
| | PC/ABS | — | — | — | — | — | — | 100 |
| | HIPS | — | — | — | — | — | — | — |
| | PC | — | — | — | — | — | — | — |
| | PA6 | — | — | — | — | — | — | — |
| | PLA | — | — | — | — | — | — | — |
| | PBT/ABS | — | — | — | — | — | — | — |
| | PC/PBT | — | — | — | — | — | — | — |
| Crystallization temperature (° C.) | | 18 | — | 24 | 24 | 18 | 18 | — |
| Cutting property (%) | | 35 | — | 48 | 48 | 35 | 35 | — |
| Storage stability of antistatic agent | | x | — | x | x | x | x | — |
| Surface resistivity (Ω/□) | after 1 day | $1.1 \times 10^{10}$ | $1.0 \times 10^{16}$ | $1.4 \times 10^{11}$ | $2.1 \times 10^{9}$ | $1.6 \times 10^{11}$ | $2.3 \times 10^{9}$ | $1.0 \times 10^{15}$ |
| | after 30 days | $1.2 \times 10^{10}$ | $1.0 \times 10^{16}$ | $1.5 \times 10^{11}$ | $2.1 \times 10^{9}$ | $1.6 \times 10^{11}$ | $2.3 \times 10^{9}$ | $1.0 \times 10^{15}$ |

TABLE 12

| | | Comparative Example 27 | Comparative Example 28 | Comparative Example 29 | Comparative Example 30 | Comparative Example 31 | Comparative Example 32 | Comparative Example 33 |
|---|---|---|---|---|---|---|---|---|
| Antistatic agent | Polymer compound (E)-1 | — | — | — | — | — | — | — |
| | Comparative antistatic agent-1 | 10 | 20 | — | — | — | 10 | 20 |
| | Comparative antistatic agent-2 | — | — | 10 | 20 | — | — | — |
| Alkali metal salt | NaDBS*1 | 1.0 | 2.0 | 1.0 | 2.0 | — | 1.0 | 2.0 |
| Ionic liquid | BMIM-DBS*4 | — | — | — | — | — | — | — |
| Thermoplastic resin | ICP | — | — | — | — | — | — | — |
| | HDPE | — | — | — | — | — | — | — |
| | PBT | — | — | — | — | — | — | — |
| | ABS | — | — | — | — | — | — | — |

TABLE 12-continued

| | | Comparative Example 27 | Comparative Example 28 | Comparative Example 29 | Comparative Example 30 | Comparative Example 31 | Comparative Example 32 | Comparative Example 33 |
|---|---|---|---|---|---|---|---|---|
| | PC/ABS | 90 | 80 | 90 | 80 | — | — | — |
| | HIPS | — | — | — | — | 100 | 90 | 80 |
| | PC | — | — | — | — | — | — | — |
| | PA6 | — | — | — | — | — | — | — |
| | PLA | — | — | — | — | — | — | — |
| | PBT/ABS | — | — | — | — | — | — | — |
| | PC/PBT | — | — | — | — | — | — | — |
| Crystallization temperature (° C.) | | 24 | 24 | 18 | 18 | — | 24 | 24 |
| Cutting property (%) | | 48 | 48 | 35 | 35 | — | 48 | 48 |
| Storage stability of antistatic agent | | x | x | x | x | — | x | x |
| Surface resistivity (Ω/□) | after 1 day | 2.5 × $10^{11}$ | 3.4 × $10^{9}$ | 2.7 × $10^{11}$ | 3.7 × $10^{9}$ | 1.0 × $10^{16}$ | 2.0 × $10^{10}$ | 2.0 × $10^{9}$ |
| | after 30 days | 2.5 × $10^{11}$ | 3.3 × $10^{9}$ | 2.8 × $10^{11}$ | 3.8 × $10^{9}$ | 1.0 × $10^{16}$ | 2.0 × $10^{10}$ | 2.1 × $10^{9}$ |

TABLE 13

| | | Comparative Example 34 | Comparative Example 35 | Comparative Example 36 | Comparative Example 37 | Comparative Example 38 | Comparative Example 39 | Comparative Example 40 |
|---|---|---|---|---|---|---|---|---|
| Antistatic agent | Polymer compound (E)-1 | — | — | — | — | — | — | — |
| | Comparative antistatic agent-1 | — | — | — | 10 | — | — | 10 |
| | Comparative antistatic agent-2 | 10 | 20 | — | — | 10 | — | — |
| Alkali metal salt | NaDBS*1 | 1.0 | 2.0 | — | 1.0 | 1.0 | — | 1.0 |
| Ionic liquid | BMIM-DBS*4 | — | — | — | — | — | — | — |
| Thermoplastic resin | ICP | — | — | — | — | — | — | — |
| | HDPE | — | — | — | — | — | — | — |
| | PBT | — | — | — | — | — | — | — |
| | ABS | — | — | — | — | — | — | — |
| | PC/ABS | — | — | — | — | — | — | — |
| | HIPS | 90 | 80 | — | — | — | — | — |
| | PC | — | — | 100 | 90 | 90 | — | — |
| | PA6 | — | — | — | — | — | 100 | 90 |
| | PLA | — | — | — | — | — | — | — |
| | PBT/ABS | — | — | — | — | — | — | — |
| | PC/PBT | — | — | — | — | — | — | — |
| Crystallization temperature (° C.) | | 18 | 18 | — | 24 | 18 | — | 24 |
| Cutting property (%) | | 35 | 35 | — | 48 | 35 | — | 48 |
| Storage stability of antistatic agent | | x | x | — | x | x | — | x |
| Surface resistivity (Ω/□) | after 1 day | 2.2 × $10^{10}$ | 2.2 × $10^{9}$ | 1.0 × $10^{15}$ | 8.5 × $10^{11}$ | 9.3 × $10^{11}$ | 5.0 × $10^{14}$ | 8.5 × $10^{11}$ |
| | after 30 days | 2.1 × $10^{10}$ | 2.2 × $10^{9}$ | 1.0 × $10^{15}$ | 8.4 × $10^{11}$ | 9.1 × $10^{11}$ | 5.0 × $10^{14}$ | 8.5 × $10^{11}$ |

TABLE 14

| | | Comparative Example 41 | Comparative Example 42 | Comparative Example 43 | Comparative Example 44 | Comparative Example 45 | Comparative Example 46 | Comparative Example 47 |
|---|---|---|---|---|---|---|---|---|
| Antistatic agent | Polymer compound (E)-1 | — | — | — | — | — | — | — |
| | Comparative antistatic agent-1 | — | — | 10 | — | — | 10 | 20 |
| | Comparative antistatic agent-2 | 10 | — | — | 10 | — | — | — |
| Alkali metal salt | NaDBS*1 | 1.0 | — | 1.0 | 1.0 | — | 1.0 | 2.0 |
| Ionic liquid | BMIM-DBS*4 | — | — | — | — | — | — | — |
| Thermoplastic resin | ICP | — | — | — | — | — | — | — |
| | HDPE | — | — | — | — | — | — | — |
| | PBT | — | — | — | — | — | — | — |
| | ABS | — | — | — | — | — | — | — |
| | PC/ABS | — | — | — | — | — | — | — |
| | HIPS | — | — | — | — | — | — | — |
| | PC | — | — | — | — | — | — | — |

TABLE 14-continued

| | | Comparative Example 41 | Comparative Example 42 | Comparative Example 43 | Comparative Example 44 | Comparative Example 45 | Comparative Example 46 | Comparative Example 47 |
|---|---|---|---|---|---|---|---|---|
| | PA6 | 90 | — | — | — | — | — | — |
| | PLA | — | 100 | 90 | 90 | — | — | — |
| | PBT/ABS | — | — | — | — | 100 | 90 | 80 |
| | PC/PBT | — | — | — | — | — | — | — |
| Crystallization temperature (° C.) | | 18 | — | 24 | 18 | — | 24 | 24 |
| Cutting property (%) | | 35 | — | 48 | 35 | — | 48 | 48 |
| Storage stability of antistatic agent | | x | — | x | x | — | x | x |
| Surface resistivity (Ω/□) | after 1 day | $9.2 \times 10^{11}$ | $1.0 \times 10^{16}$ | $5.5 \times 10^{12}$ | $6.2 \times 10^{12}$ | $1.0 \times 10^{16}$ | $1.0 \times 10^{13}$ | $1.2 \times 10^{10}$ |
| | after 30 days | $9.3 \times 10^{11}$ | $1.0 \times 10^{16}$ | $5.5 \times 10^{12}$ | $6.3 \times 10^{12}$ | $1.0 \times 10^{16}$ | $1.1 \times 10^{13}$ | $1.2 \times 10^{10}$ |

TABLE 15

| | | Comparative Example 48 | Comparative Example 49 | Comparative Example 50 | Comparative Example 51 | Comparative Example 52 | Comparative Example 53 | Comparative Example 54 |
|---|---|---|---|---|---|---|---|---|
| Antistatic agent | Polymer compound (E)-1 | — | — | — | — | — | — | — |
| | Comparative antistatic agent-1 | — | — | — | 10 | 20 | — | — |
| | Comparative antistatic agent-2 | 10 | 20 | — | — | — | 10 | 20 |
| Alkali metal salt | NaDBS*1 | 1.0 | 2.0 | — | 1.0 | 2.0 | 1.0 | 2.0 |
| Ionic liquid | BMIM-DBS*4 | — | — | — | — | — | — | — |
| Thermoplastic resin | ICP | — | — | — | — | — | — | — |
| | HDPE | — | — | — | — | — | — | — |
| | PBT | — | — | — | — | — | — | — |
| | ABS | — | — | — | — | — | — | — |
| | PC/ABS | — | — | — | — | — | — | — |
| | HIPS | — | — | — | — | — | — | — |
| | PC | — | — | — | — | — | — | — |
| | PA6 | — | — | — | — | — | — | — |
| | PLA | — | — | — | — | — | — | — |
| | PBT/ABS | 90 | 80 | — | — | — | — | — |
| | PC/PBT | — | — | 100 | 90 | 80 | 90 | 80 |
| Crystallization temperature (° C.) | | 18 | 18 | — | 24 | 24 | 18 | 18 |
| Cutting property (%) | | 35 | 35 | — | 48 | 48 | 35 | 35 |
| Storage stability of antistatic agent | | x | x | — | x | x | x | x |
| Surface resistivity (Ω/□) | after 1 day | $1.2 \times 10^{13}$ | $1.3 \times 10^{10}$ | $1.0 \times 10^{15}$ | $5.0 \times 10^{12}$ | $1.9 \times 10^{10}$ | $5.8 \times 10^{12}$ | $2.2 \times 10^{10}$ |
| | after 30 days | $1.2 \times 10^{13}$ | $1.2 \times 10^{10}$ | $1.0 \times 10^{15}$ | $4.8 \times 10^{12}$ | $1.8 \times 10^{10}$ | $5.5 \times 10^{12}$ | $2.1 \times 10^{10}$ |

From the above, it is seen that the antistatic agent of the present invention can continuously impart excellent antistaticity to a synthetic resin and has excellent storage stability and productivity.

The invention claimed is:

1. An antistatic agent, comprising at least one polymer compound (E) which is obtained by a reaction of a polyester (a) obtained by a reaction between a diol (a1) and a dicarboxylic acid (a2), a compound (b) comprising at least one ethyleneoxy group and having hydroxy groups at both ends, and an epoxy compound (D) comprising two or more epoxy groups, wherein the diol (a1) is at least either of 1,4-butanediol and ethylene glycol, and the dicarboxylic acid (a2) is succinic acid or a dicarboxylic acid mixture comprising succinic acid.

2. The antistatic agent according to claim 1, wherein the polymer compound (E) comprises: a polyester block (A) constituted by the polyester (a); and a polyether block (B) constituted by the compound (b), and the polymer compound (E) has a structure in which the polyester block (A) and the polyether block (B) are bound via ester bonds or ether bonds which are each formed by a reaction of a terminal hydroxy group or carboxyl group of the polyester (a), a terminal hydroxy group of the compound (b), and an epoxy group of the epoxy compound (D) or a hydroxy group formed by a reaction of the epoxy group.

3. The antistatic agent according to claim 2, wherein the polymer compound (E) has a structure in which a block polymer (C) having carboxyl groups at both ends, in which the polyester block (A) and the polyether block (B) are repeatedly and alternately bound via ester bonds, and the epoxy compound (D) are bound via ester bonds.

4. The antistatic agent according to claim 3, wherein the block polymer (C) of the polymer compound (E) has a number-average molecular weight of 5,000 to 50,000 in terms of polystyrene.

5. The antistatic agent according to claim 3, wherein the polyester (a) of the polymer compound (E) has a structure comprising carboxyl groups at both ends.

6. The antistatic agent according to claim 3, wherein the compound (b) of the polymer compound (E) is a polyethylene glycol.

7. The antistatic agent according to claim 3, wherein the polymer compound (E) has a crystallization temperature in a range of 20 to 70° C.

8. The antistatic agent according to claim 2, wherein the polyester (a) of the polymer compound (E) has a structure comprising carboxyl groups at both ends.

9. The antistatic agent according to claim 2, wherein the compound (b) of the polymer compound (E) is a polyethylene glycol.

10. The antistatic agent according to claim 2, wherein the polymer compound (E) has a crystallization temperature in a range of 20 to 70° C.

11. The antistatic agent according to claim 1, wherein the polyester (a) of the polymer compound (E) has a structure comprising carboxyl groups at both ends.

12. The antistatic agent according to claim 11, wherein the compound (b) of the polymer compound (E) is a polyethylene glycol.

13. The antistatic agent according to claim 1, wherein the compound (b) of the polymer compound (E) is a polyethylene glycol.

14. The antistatic agent according to claim 1, wherein the polymer compound (E) has a crystallization temperature in a range of 20 to 70° C.

15. The antistatic agent according to claim 1, wherein the polyester (a) of the polymer compound (E) has a number-average molecular weight of 1,000 to 10,000 in terms of polystyrene.

16. An antistatic agent composition, obtained by incorporating at least one selected from the group consisting of alkali metal salts and ionic liquids into the antistatic agent according to claim 1.

17. An antistatic resin composition, obtained by incorporating the antistatic agent composition according to claim 16 into a synthetic resin.

18. An antistatic resin composition, obtained by incorporating the antistatic agent according to claim 1 into a synthetic resin.

19. The antistatic resin composition according to claim 18, wherein the synthetic resin is at least one selected from the group consisting of polyolefin-based resins, polystyrene-based resins, and copolymers thereof.

20. A molded article, comprising the antistatic resin composition according to claim 18.

* * * * *